(12) United States Patent
Wanda

(10) Patent No.: US 6,916,127 B2
(45) Date of Patent: Jul. 12, 2005

(54) INFORMATION PROCESSING APPARATUS, INFORMATION PROCESSING SYSTEM, PRINT CONTROL METHOD, AND STORAGE MEDIUM STORING COMPUTER READABLE PROGRAM

(75) Inventor: Koichiro Wanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/241,569

(22) Filed: Sep. 12, 2002

(65) Prior Publication Data

US 2003/0007819 A1 Jan. 9, 2003

Related U.S. Application Data

(62) Division of application No. 09/605,681, filed on Jun. 28, 2000, now Pat. No. 6,474,881.

(30) Foreign Application Priority Data

Jun. 30, 1999 (JP) .............................................. 11-185775
Jun. 13, 2000 (JP) ....................................... 2000-176982

(51) Int. Cl.[7] .............................................. B41J 11/44
(52) U.S. Cl. ............................................ 400/61; 70/76

(58) Field of Search ................................ 400/61, 70, 76

(56) References Cited

U.S. PATENT DOCUMENTS

| | | | |
|---|---|---|---|
| 5,528,375 A | 6/1996 | Wegeng et al. | 345/502 |
| 5,970,224 A | 10/1999 | Salgado et al. | 358/1.14 |
| 6,115,132 A | 9/2000 | Nakatsuma et al. | 385/1.14 |
| 6,252,681 B1 | 6/2001 | Gusmano et al. | 358/468 |

FOREIGN PATENT DOCUMENTS

JP      11-119940 A     4/1999

Primary Examiner—Charles H. Nolan, Jr.
(74) Attorney, Agent, or Firm—Fitzpatrick, Cella, Harper & Scinto

(57) ABSTRACT

The object is to print continuously in the specified order by one operation a series of print jobs printed in any timing by a plurality of host computers for the same printer even if a usual print job is spooled together in a print server. In a method for solving the problem, a print server identifies ordered print jobs for which print order is to be specified and non-ordered print jobs out of a plurality of print jobs transmitted in any timing from a client, the print order for each print job identified as such is rearranged and aligned in specified order, and the output order for each print job aligned for a printer based on the state of alignment.

15 Claims, 16 Drawing Sheets

FIG. 7

| JOB ID |
|---|
| PRINTER NAME |
| MACHINE NAME |
| JOB STATUS |
| DOCUMENT NAME |
| DATA SIZE |
| SPOOL METHOD |
| ⋮ |
| GROUP PRINT YES/NO |
| GROUP NAME |
| PRINT ORDER IN GROUP |
| NO. OF JOBS IN GROUP |
| ⋮ |

FIG. 8

| CLIENT NAME | GROUP NAME (ID) | PRINT ORDER | NO. OF JOBS |
|---|---|---|---|

FIG. 16

GP-INFO

| GROUP NAME |
| --- |
| NO. OF JOBS |
| PRINTER NAME |
| PRINTER STATUS |
| SUBSTITUTE PRINTER |
| ⋮ |
| JOB ID |
| 1 (PRINT ORDER) |
| STATUS |
| CLIENT NAME |
| ⋮ |
| JOB ID |
| 2 (PRINT ORDER) |
| STATUS |
| CLIENT NAME |
| ⋮ |

GROUP PRINT ☒
JOB ID: 0001
DOCUMENT NAME: SPECS §3
GROUP NAME: [GROUP1] [REFER]
PRINT ORDER: [1]/[10]

[OK] [CANCEL]

FIG. 18

| GROUP NAME | PRINT ORDER | STATUS | SPOOL | CLIENT |
|---|---|---|---|---|
| GROUP1 | 1/3 | WAITING FOR PRINT | CLIENT | PC1 |
| | 2/3 | WAITING FOR PRINT | SERVER | PC2 |
| | 3/3 | UNPROCESSED | | |
| GROUP2 | 1/5 | WAITING FOR PRINT | SERVER | PCX |
| | 2/5 | UNPROCESSED | | |
| | 3/5 | UNPROCESSED | | |
| | ---- | | | |

[ OK ]  [ CANCEL ]

GROUP JOB MANAGEMENT TABLE

MEMORY MAP OF MEMORY MEDIUM
SUCH AS FD/CD-ROM

| DIRECTORY |
|---|
| 1ST DATA PROCESSING PROGRAM PROGRAM CODES FOR FLOWCHART OF FIG. 10 |
| 2ND DATA PROCESSING PROGRAM PROGRAM CODES FOR FLOWCHART OF FIG. 11 |
| 3RD DATA PROCESSING PROGRAM PROGRAM CODES FOR FLOWCHART OF FIG. 12 |
| 4TH DATA PROCESSING PROGRAM PROGRAM CODES FOR FLOWCHART OF FIG. 13 |
| 5TH DATA PROCESSING PROGRAM PROGRAM CODES FOR FLOWCHART OF FIG. 14 |
| 6TH DATA PROCESSING PROGRAM PROGRAM CODES FOR FLOWCHART OF FIG. 15 |
|  |

INFORMATION PROCESSING APPARATUS, INFORMATION PROCESSING SYSTEM, PRINT CONTROL METHOD, AND STORAGE MEDIUM STORING COMPUTER READABLE PROGRAM

This application is a division of application Ser. No. 09/605,681, filed on Jun. 28, 2000 now U.S. Pat. No. 6,474,881.

BACKGROUND OF THE INVENTION

1. Field of the Invention

The present invention relates to an information processing apparatus, an information processing system, a print control method and a storage medium storing a computer readable program, which can control a print job received from host equipment to be transferred to a printer, and particularly relates to an information processing apparatus, a print system, a print controlling method and a storage medium storing a computer readable program, as a print server that manages print jobs received from a plurality of client computers as host equipment on a group basis and controls the print jobs as a group job to be transmitted to a printer.

2. Related Background Art

Conventionally, the printer system to which this type of information processing unit can be applied is configured to enable a printer to communicate with a client computer (PC), a server computer and the like, and is configured to store a print job received upon a job processing request from each client in a job spooler in the order of reception and sequentially analyze the print job and print it by the printer.

Furthermore, print systems in recent years are configured such that the job name of a print job and the like spooled in a server can be displayed on a client, and there exist systems that make it possible to specify a print job and perform suspension and termination and even order control of the printing of specified print jobs depending on the authorization of the client by using network utility software installed in the client.

Furthermore, as software operating on clients in recent years, there exist systems that enables batch print, by holding print jobs of PDL format generated by a printer driver without requesting a print server to print them, and transmitting by one operation a plurality of print jobs as a print request to a print server.

However, in the above described utility software of prior art, it is possible to perform order control for print jobs spooled in a server (print server), but it is not possible to group a plurality of jobs and control the printing of the group job so as not to allow other print jobs to interrupt in the group job.

Furthermore, for reducing the load on a network and a print server, it is conceivable that only a print request and job information are transmitted from the client to the print server, the order control is managed at the print server and the print job itself is spooled by the client making a print request, but it is impossible to print by one operation a plurality of jobs split and spooled in both the print server to be outputted to the same printer from different clients and the client, or to specify from a different client the order in which jobs client-spooled in the same group are processed.

Furthermore, when print jobs are grouped, all print jobs to be grouped are not necessarily already prepared, and the user using a client computer can not necessarily make a request for printing a next print job in print order instantly from the client computer in every occasion, and it is conceivable that a print request is made after a considerable time because the user is absent for a certain time. In this case, since printing can not be started unless all print jobs that are grouped are ready for printing, in other words, unless the print jobs are ready to be transmitted to the printer, print jobs spooled in a server spooler at the print server and in a client spooler at each client must keep waiting, but in the conventional print queue, it is a precondition that the print job for which a print request is made is ready for printing and therefore the print job must be transmitted to the printer when turn for the print job to be printed comes in the print queue.

Furthermore, in conventional software that enables batch print, print jobs from a single client can be printed by one operation, but print jobs generated from a plurality of clients can not be printed by one operation.

Furthermore, in a conventional manner, a notification of completion is provided to the client making a request once an output of each print job is ended since the processing of group printing is not taken into account, thus not confirming the state of printing for all jobs printed in the same group and the fact that a set of printing has been properly done prior to provide the notification of completion to each client.

Furthermore, there are disadvantages that if printing fails due to a printer error and the like before it is confirmed that printing for all the jobs in the group has been done, the user making a print request or the server cannot change the printing matter unless all the jobs in the group are consolidated and the client is notified thereof, a quick and flexible response cannot be made to the emergence of such an error, the group print operation remains suspended, and an intended result of printing operation cannot be obtained quickly.

Furthermore, for the single print job, it is taken into account to change the printing matter in print systems in recent years, but it is not taken into account to change the printing matter for the grouping job as described above. Therefore, for the single print job, the ejection side is not a matter of concern so long as PDL is the same even when the printing matter is changed. That is because the print job is internally spooled and printing in invert page order is achieved due to the function of the printer itself. However, it is achieved due to the function of the printer itself only for the single job, and it not yet achieved for the grouping job considered in the present invention.

SUMMARY OF THE INVENTION

This invention is designed to solve the above described problems, and it is a first object of the present invention to enable print control that prevents a usual print job from being mixed with grouping print jobs for the same printer even if the usual print job is spooled together in the print server in the case where a plurality of print jobs for which requests for printing are made by a plurality of clients are grouped and then printed.

Furthermore, it is a second object of the present invention to confirm that print jobs whose print operation is ended have been actually printed and ejected by one operation and inform the host computer of each print job that they have been printed by one operation.

Furthermore, it is a third object of the present invention to change the printing matter to another printer by one operation if an error occurs in a printer before jobs to be printed are printed and ejected by one operation.

Furthermore, it is a fourth object of the present invention to provide a mechanism in which a printer performs processing on the print job in the order of reception, thereby making it possible to maintain the proper order of printing even if the printing matter is changed to a printer whose ejection side is different.

Furthermore, it is a fifth object of the present invention to provide a mechanism in which the grouping job where print jobs from a plurality of clients are grouped and printed is specified when a print request from the clients.

An information processing unit as a server of the present invention has;

identifying means for identifying first print jobs with a plurality of print jobs to be grouped and printed in succession and second print jobs to be printed as a single print job, based on print requests received from clients;

determining means for determining whether all print jobs in a grouping print job corresponding to the above described print job are ready if the above described print request is a request for printing print jobs identified by the above described identifying means as the first print job; and controlling means for controlling the print of grouping print jobs for which it is determined by the above described determining means that all print jobs in the group are ready, while controlling the print of grouping print jobs for which it is determined by the above described determining means that all print jobs in the group are not yet ready to be held.

Furthermore, a second information processing unit related to the present invention has;

job managing means for managing grouping jobs with a plurality of print jobs to be grouped and printed in succession based on print requests received from a plurality of clients, determining means for determining the spooling matter spooling a plurality of print jobs included in the above described grouping jobs when the above described grouping jobs are printed, and transmission controlling means for controlling transmission so that print jobs determined by the above described determining means as being spooled in the above described clients transmit transmission permission information for permitting transmission of the above described print jobs to the above described client, and print jobs determined by the above described determining means as being spooled in their own spoolers transmit the above described print jobs spooled therein to a printer.

Furthermore, a third invention related to the present invention has;

acquiring means for acquiring information of grouping jobs being managed at a management server from the management server managing the order of printing grouping jobs with a plurality of print jobs to be grouped and printed in succession, first user interface providing means for providing a first user interface for specifying grouping jobs into which print jobs for which a print request is to be made are grouped based on the information of the grouping jobs acquired by the above described acquiring means, and print request making means for making a print request including indicative information to group print jobs into grouping jobs specified via the first user interface provided by the above described first user interface providing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 illustrates an example of a data structure of job information common to a client and a server shown in FIG. 6;

FIG. 8 illustrates an example of group specified information managed by a client machine shown in FIG. 6;

FIG. 16 illustrates an example of a data structure of group print information generated by a server machine shown in FIG. 6;

FIG. 17 illustrates an example of a dialog box screen for specifying a group print provided by modules in a client;

FIG. 18 illustrates an example of a graphical user interface screen displayed on the client in accordance with a group job management table managed at a print server;

FIG. 19 illustrates an example of a graphical user interface for performing a print setting provided by a printer driver; and FIG. 20 illustrates a memory map of a storage medium storing each type of data processing program that can be read by a print system to which an information processing unit of the present invention is applicable.

DETAILED DESCRIPTION OF PREFERRED EMBODIMENTS

[First Embodiment]

Figure 1:
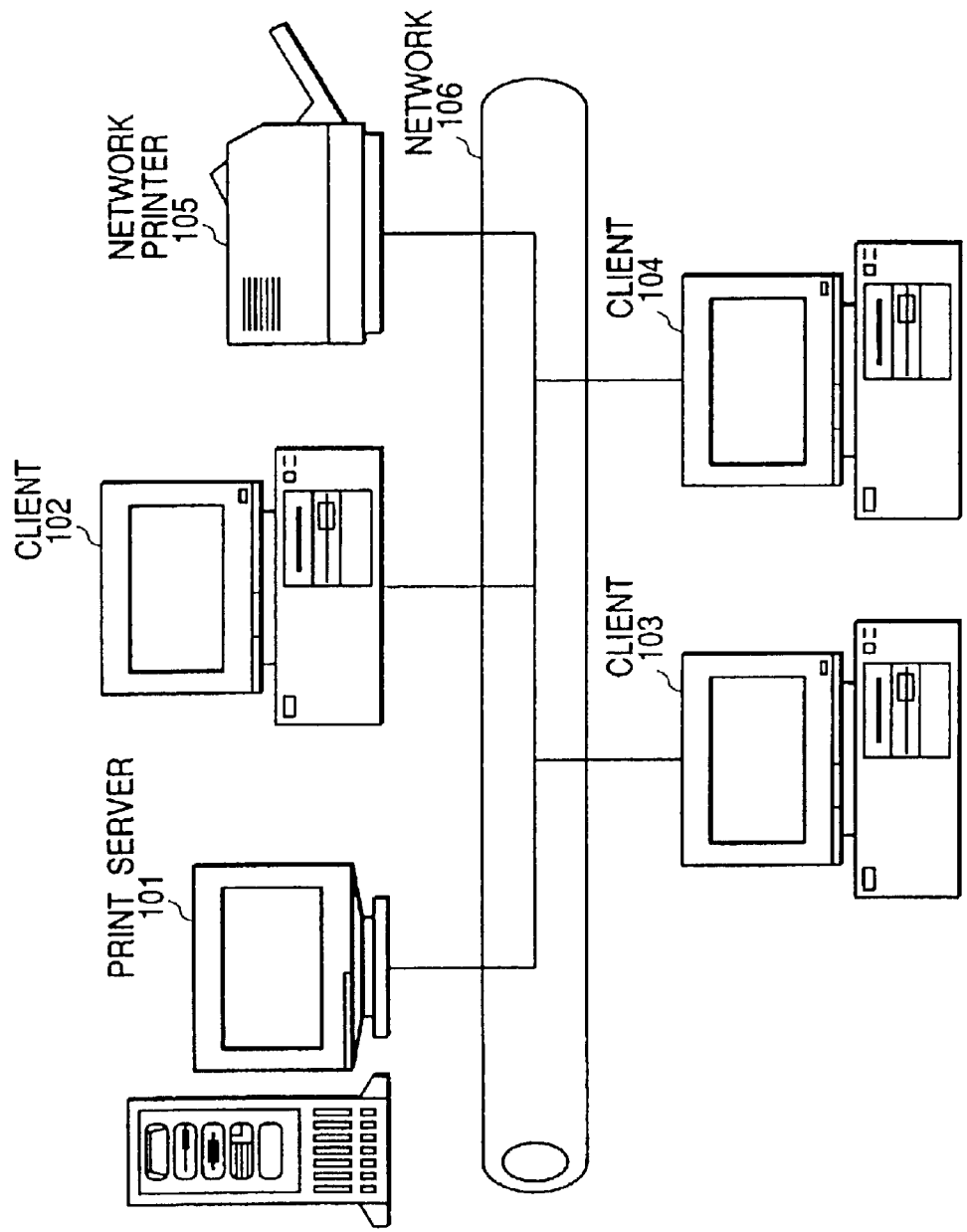
FIG. 1 is a block diagram illustrating a configuration of an information processing system to which the present invention is applicable.

FIG. 1 is a block diagram for explaining the configuration of an information processing system to which the present invention can be applied. It is assumed that the number of client computers connected to this system is n.

In FIG. 1, reference numerals 102, 103 and 104 denote information processors as client computers (client) which are connected to a network 106 by a network 106 by a network cable of an Ethernet or the like. These computers can execute various kinds of application programs and are loaded with printer drivers each having a function for converting print data into a printer language corresponding to a printer.

Reference numeral 101 is an information processor as a server (called a print server, hereinafter) and connected to the network 106 by the network cable to accumulate files employed in the network or to monitor the using status of the network 106. The print server 101 manages a plurality of printers connected to the network 106. In the configuration, the clients 102 to 104 and the print server 101 serve as general information processors. In the clients and the print server, print control programs for performing respectively different controls are stored so as to be executable.

The print server 101 in the first embodiment of the invention further includes functions for storing and printing print jobs having the print data for which print requests are issued from the client computers 102, 103 and 104, or receiving only job information including no print data from the client computers 102, 103 and 104, managing the print order of the client computers 102. 103 and 104, or informing the clients arranged in accordance with the print order of the transmit permission of the print jobs including the print data, obtaining a variety of kinds of information of the status or the print jobs of a network printer 105 or informing the client computers 102, 103 and 104 of them.

Reference numeral 105 denotes the network printer as a print controller which is connected to the network 106 through a network interface not shown. The network printer 105 analyzes the print job including the print data transmitted from the each client computer and converts it into a dot image one page by one page and prints each page. Reference numeral 106 denotes the network connected to the client computers 102, 103, 104, the server 101, the network server 105 or the like.

Figure 2:
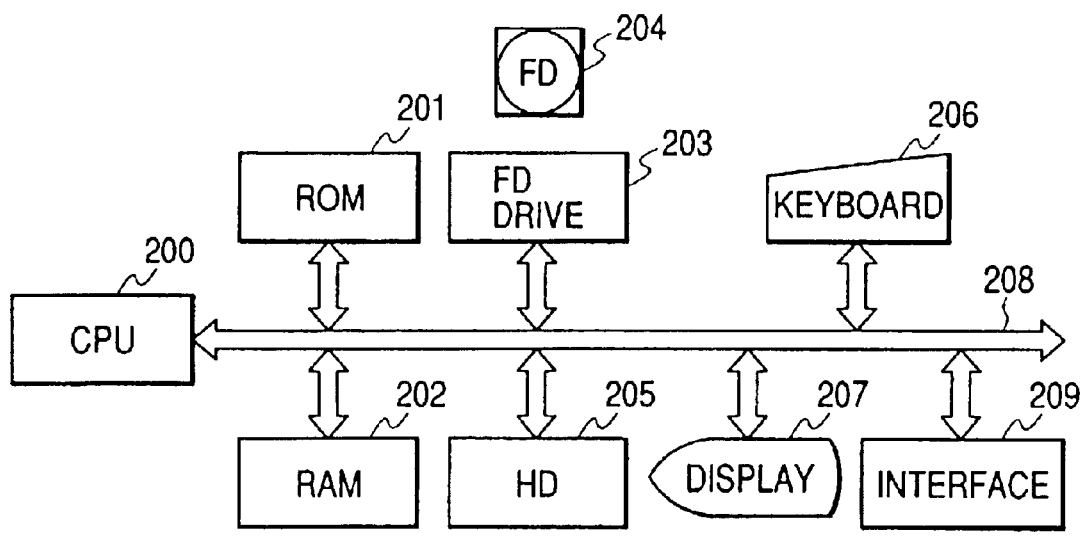
FIG. 2 is a block diagram illustrating a configuration of an information processing unit that shows a first embodiment of the present invention.

FIG. 2 is a block diagram for explaining the configuration of an information processor according to the present invention. The client computers 102, 103, 104 as the information processors have the same configurations as the above. The server 101 also has a hardware configuration similar to the above configuration.

Accordingly, FIG. 2 is shown as the block diagram for explaining the configurations of the clients and the server.

In FIG. 2, reference numeral 200 denotes a CPU as the control means of the information processors and controls to execute application programs stored in a hard disk (HD) 205, printer driver programs, OS and the control programs of the network printer control program of the present invention and to temporarily store in a RAM 202 information, files, etc. required for executing the programs.

Reference numeral 201 denotes a ROM in which various data including programs such as basic I/O programs, font data utilized upon document processing, data for a template, etc. are stored. Reference numeral 202 denotes a RAM as temporarily storing means functioning as the main memory, the work area, etc. of the CPU 200.

Figure 5:
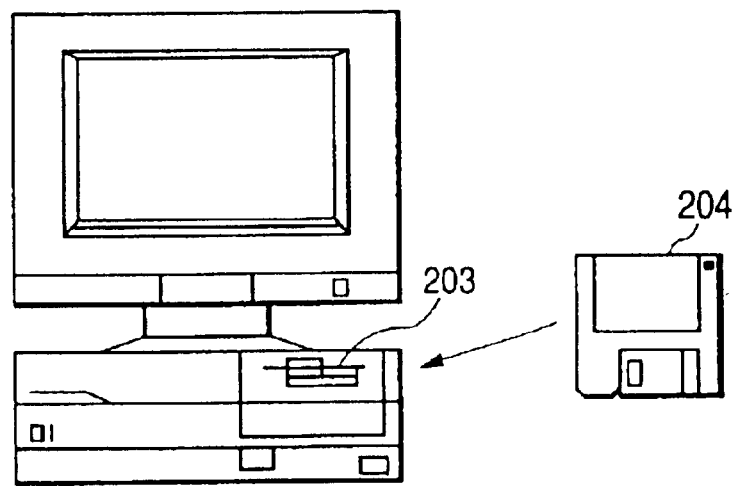
FIG. 5 illustrates a relationship of an FD drive shown in FIG. 2 with the FD inserted therein.

Reference numeral 203 denotes a floppy disk (FD) drive as storing medium reading means which can load a main computer system with programs stored in an FD 204 as the storing medium through an FD drive 203 as shown in FIG. 5 described below. In this connection, the storing medium is not limited to the FD and may include a CD-ROM, a CD-R, a CD-RW, a PC card, a DVD, an IC memory card, an MO, a memory stick, etc.

Reference numeral 204 denotes the floppy disk (FD) as the storing medium in which programs readable by a computer are stored. In this FD 204, the network printer control program described in the present embodiment and related data are stored. The configuration of contents stored in the FD 204 will be described below by referring to FIG. 4.

Reference numeral 205 denotes the hard disk (HD) which is one of external storing means and functions as a large capacity storage memory in which the application program, the printer driver program, the OS, the network printer program, the associated program, etc. are stored. Further, a spooler as spooling means is maintained therein. The spooling means designates a client spooler in the clients, and a server spooler in the print server. Further, in the print server, a table for storing the job information received from the clients and controlling the order is also formed and stored in the external storing means.

Reference numeral 206 denotes a keyboard as instruction input means through which a user instructs the client computer to input the instructions of the control command of a device, or an operator or a manager instructs the print server to input the instructions.

Reference numeral 207 denotes a display as display means adapted to display the commands inputted from the keyboard 206, and the state of the printer, etc.

Reference numeral 208 denotes a system bus for governing the flow of data in the computers such as the clients or the print server.

Reference numeral 209 denotes an interface as input and output means through which the information processors transmit data and receive data between an external device and them.

Figure 3:
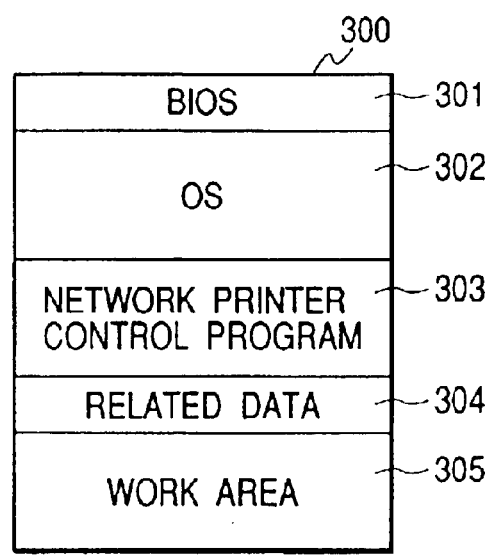
FIG. 3 illustrates an example of a memory map of a RAM shown in FIG. 2.

FIG. 3 is a diagram showing an example of a memory map of the RAM 202 shown in FIG. 2. The memory map shows a state in which the RAM 202 is loaded with the network printer control program unloaded from the FD 204 so that the program can be executed.

According to the present embodiment, although an example in which the RAM 202 is loaded with the network printer control program and the associated data from the FD 204 so as to execute the program and data, the RAM 202 may be loaded with the network printer control program from the HD 205 in which the network printer program is already installed every time the network printer control program is operated from the FD 204, with the exception of the above example.

As media for storing the network printer control program, there may be exemplified the CD-ROM, the CD-R, the PC card, the DVD, the IC memory card except the FD. Further, the network printer control program may be stored in the ROM 21. Then, the network printer control program is configured to form a part of the memory map so that it can be directly executed by the CPU 200.

Further, the network printer control program may be simply called a print control program. In the clients, the print control program includes programs for performing controls of designating grouping jobs as print jobs which are designated to be grouped and instructing a printer to be changed. In the print server, the print control program includes programs for controlling the order of the grouping jobs, managing the spools of all the print jobs in the grouping jobs and noticing the end of print of the grouping jobs or a request for change of a printer, etc. The print control program of the present invention for carrying out the above mentioned controls may be separately divided into a module installed in the clients and a module installed in the print serve. An execution part may be selected so that the print control program is installed by installing it once and it functions for the clients or for the print server depending on an environment where the print control program is executed. The print control program according to the present embodiment includes both the functions.

Reference numeral 301 denotes a basic I/O program which is an area where a program with an IPL (initial program loading) function or the like for reading the OS to the RAM 202 from the HD 205 and starting the operation of the OS when the power of the controller is included.

Reference numeral 302 denotes an operating system (OS). 303 designates the network printer control program and stored in an area ensured on the RAM 202. 304 denotes the associated data and stored in an area ensured on the RAM 202. 305 denotes a work area and an area for executing the printer control program by the CPU 200 is ensured therefor.

Figure 4:
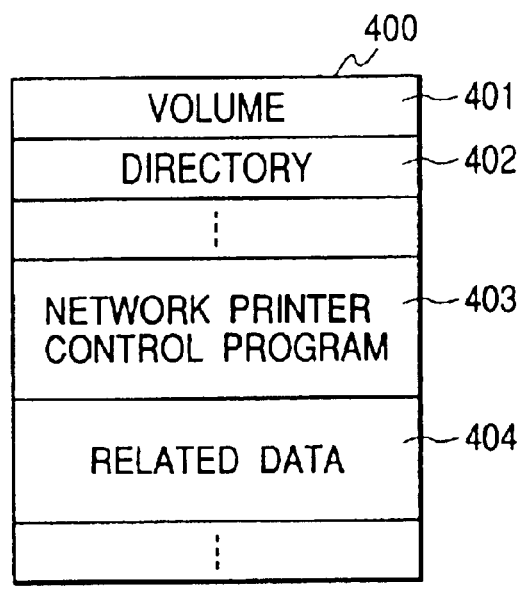
FIG. 4 illustrates an example of a memory map of an FD shown in FIG. 2.

FIG. 4 is a diagram showing one example of the memory map of the FD 204 shown in FIG. 2.

In FIG. 4, reference numeral 400 denotes the contents of the data of the FD 204. 401 denotes volume information showing the information of the data. 402 denotes directory information. 403 designates the network printer control program as the print control program which s described in the present embodiment. 404 denotes the associated data thereof. The network printer control program 403 is programmed on the basis of a flowchart described in the present embodiment. According to the present embodiment, the configuration of the client is the same as that of the server.

FIG. 5 is a view illustrating the relation between the FD 204 and the FD drive 203 shown in FIG. 2 into which the FD 204 is inserted.

In FIG. 5, the parts the same as those shown in FIG. 2 are designated by the same reference numerals.

In the FD 204, the network printer control program described in the present embodiment and the related data are stored.

Figure 6:
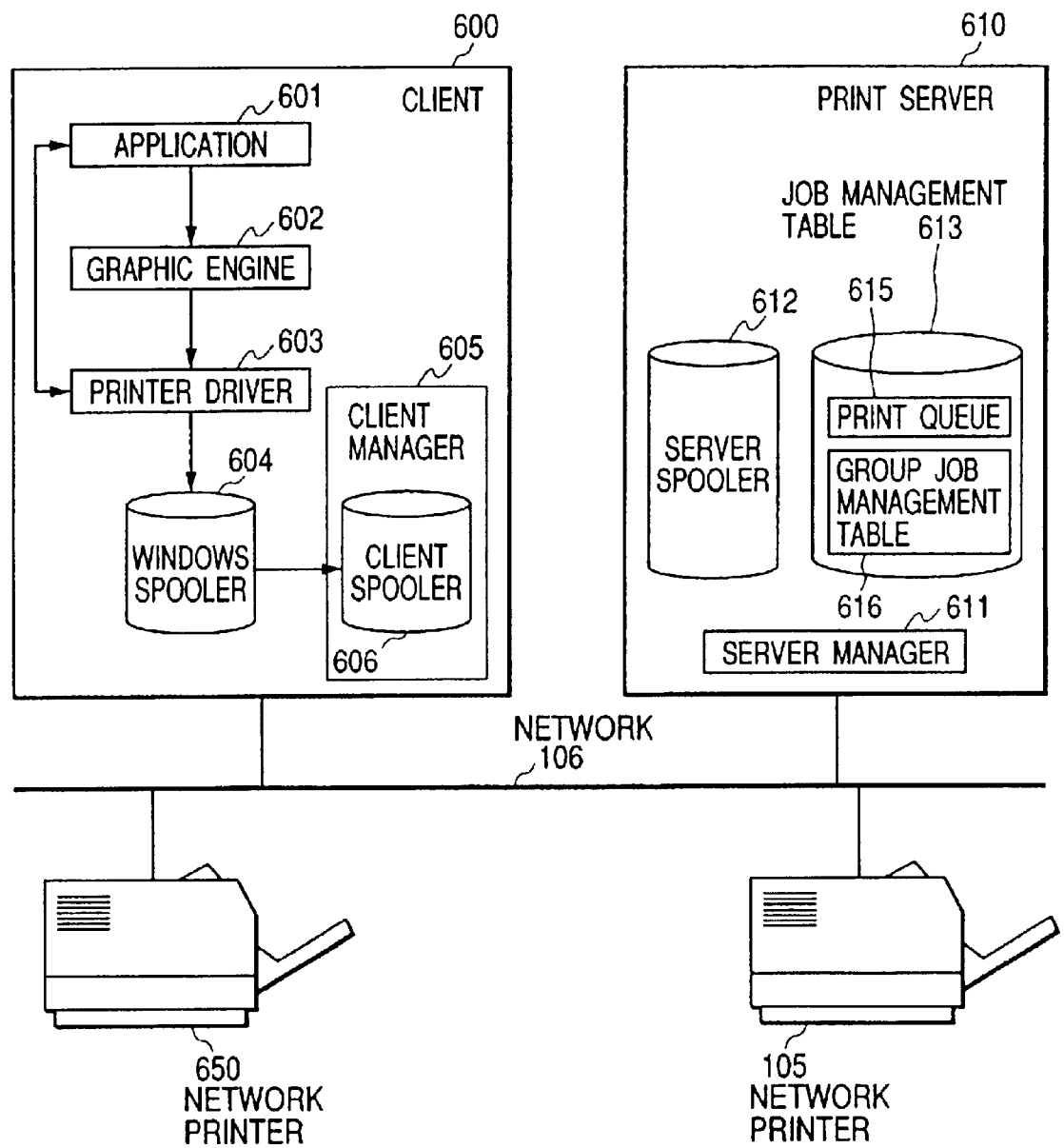
FIG. 6 is a block diagram illustrating a print control module configuration of an information processing unit that shows a first embodiment of the present invention.

FIG. 6 is a block diagram for explaining the configuration of the print control module of the information processor according to the present invention. Components the same as those shown in FIG. 1 are designated by the same reference numerals.

Referring to FIG. 6, reference numeral 600 denotes a client machine in which a client module corresponding to the network printer control program as the print control program for executing a procedure shown in a flowchart described below.

In the same figure, reference numeral 601 denotes an application software for creating documents or tables and outputs graphic drawing data to a graphic engine 602 upon displaying or printing. The graphic engine 602 is graphic drawing means provided by the OS, which indicates a GDI in the OS of Windows (registered trademark of Microsoft Corporation, in U.S.A.). The graphic engine 602 converts a GDI (Graphic Device Interface) function as the graphic drawing data outputted from the application 601 into a DDI (Device Driver Interface) function as graphic drawing data which can be interpreted by a printer driver 603 and outputs the DDI function to the printer driver 603 upon printing process. The printer driver 603 converts the DDI function into the print data including a PDL (Page Description Language) which can be interpreted by the printer on the basis of the DDI function received from the graphic engine 602 and outputs the print data as the print job with a JL (Job Language) added to a Windows Spooler 604 as a spooler provided by the OS. Further, the application 601 shifts its processing to the printer driver 603 upon set-up of printing. The printer driver 603 displays a graphical user interface screen on the display 207 as the display part to make a user perform various kinds of printing set-up. The spooler 604 of the OS sequentially delivers the print jobs received from the printer driver to a client spooler 606. A client manager 605 monitors the client spooler 606. When the spooler 606 begins to spool the print job, the client manager decides the set-up of the print job to extract jog information from the print job, in the case of the client spooler, to issue a print request to a print server 610 and to make a client spooler 606 spool the print job. On the other hand, in the case of a server spool, the client manager supplies the print job spooled in the client spooler 606 to the print server 610 as a print request to finish a print processing as the client. Further, when the client manager 605 receives a transmit permission notice of the print job from the print server 610, the client manager begins to transmit the print job spooled on the client spooler 606 directly to a network printer. At this time, the print job spooled in the client spooler is not deleted but held. When the client manager 605 receives a print completion notice from the print server 610, client manager can delete the spooled print job.

Reference numeral 610 denotes a machine in which a print server module corresponding to the network printer control program as the print control program for executing a procedure shown in a flowchart described below. 611 denotes a server manager which receives a print request from each client through the network 106. In the case where the print request is the print job including the print data, the print job is spooled in a server spooler 612 and the job information receiving the print request is managed in a job management table 613. On the other hand, in the case when the print request is the job information including no print data, the job management table is updated on the basis of the job information. Further, the server manager 611 monitors the processing state of the job in each network printer, updates the job management table 613 every time the output of the print job is completed, and starts the transmission of subsequent print jobs. At this time, when the print jobs to be transmitted are spooled in the server spooler 612, the print server 610 transmit them as they are. However, when the print jobs to be transmitted are spooled by the client spooler 606, the transmit permission notice of the print jobs is supplied to its client. Further, the job management 613 (job managing means) has a print queue 615 for controlling a print order on the basis of the job information received from the client and managing an order for sequentially supplying the transmit permissions of the print jobs and a group job management table 616 for managing as to whether or not the information of all the print jobs in a group job is prepared. Reference numerals 105 and 650 denote network printers.

In this connection, the above described classification is made depending on depending on the functions of respective devices. If both softwares are provided on the same information processors (machines), in other words, if the print server which the client asks to print is provided on the same machine, a communication between processes on the same machines can be executed without employing the network. A different machine operates as one client.

Further, the spooler of the OS may internally include similar functions to these functions.

FIG. 7 is a diagram showing one example of the data structure of the job information generated in the client and managed by the print server, as described with reference to FIG. 6. This job information is information which shows the type of the print job created by the client manager 605 on the basis of the print job generated by the printer driver 603 of the client and is transmitted to the print server 610 as the print request.

As shown in FIG. 7, the job information according to the present embodiment comprises a job ID for identifying the print job to the client from the print server, a printer name for designating a device to which the print job is outputted, a machine name as the host name of the client, the status of the print job, a document name extracted from the original document of the print job (generally, a document name designated in an application), the data size of the print job, a spool method for designating as to whether the print job is spooled by using the client spooler or by using the server spooler (0 or 1 bit expression may be utilized), a permission/inhibition of group print indicating as to whether or not the print job is grouped and controlled as a grouping job, a group name when the print job is grouped and printed as the grouping job, a print order in a group when the print job is grouped and printed, the number of jobs in a group showing the total number of print jobs included in the group when the print job is grouped and printed, etc.

FIG. 8 is a diagram showing one example of group designating information managed by the client 600 shown in FIG. 6. In the present embodiment, the group designating information is created when the client manager 605 receives the print job, as described below. Further, the group designating information may be generated by the printer driver on the basis of a value designated by a user in accordance with a user interface screen provided by the printer driver when a print step is designated from the application.

As shown in FIG. 8, the group designating information in the present embodiment comprises a client name as the host name of the client, a group name (ID) showing a group name when the print job is grouped and printed, a print order in a group when the print job is grouped and printed, the total number of jobs in a group, etc.

Figure 9:
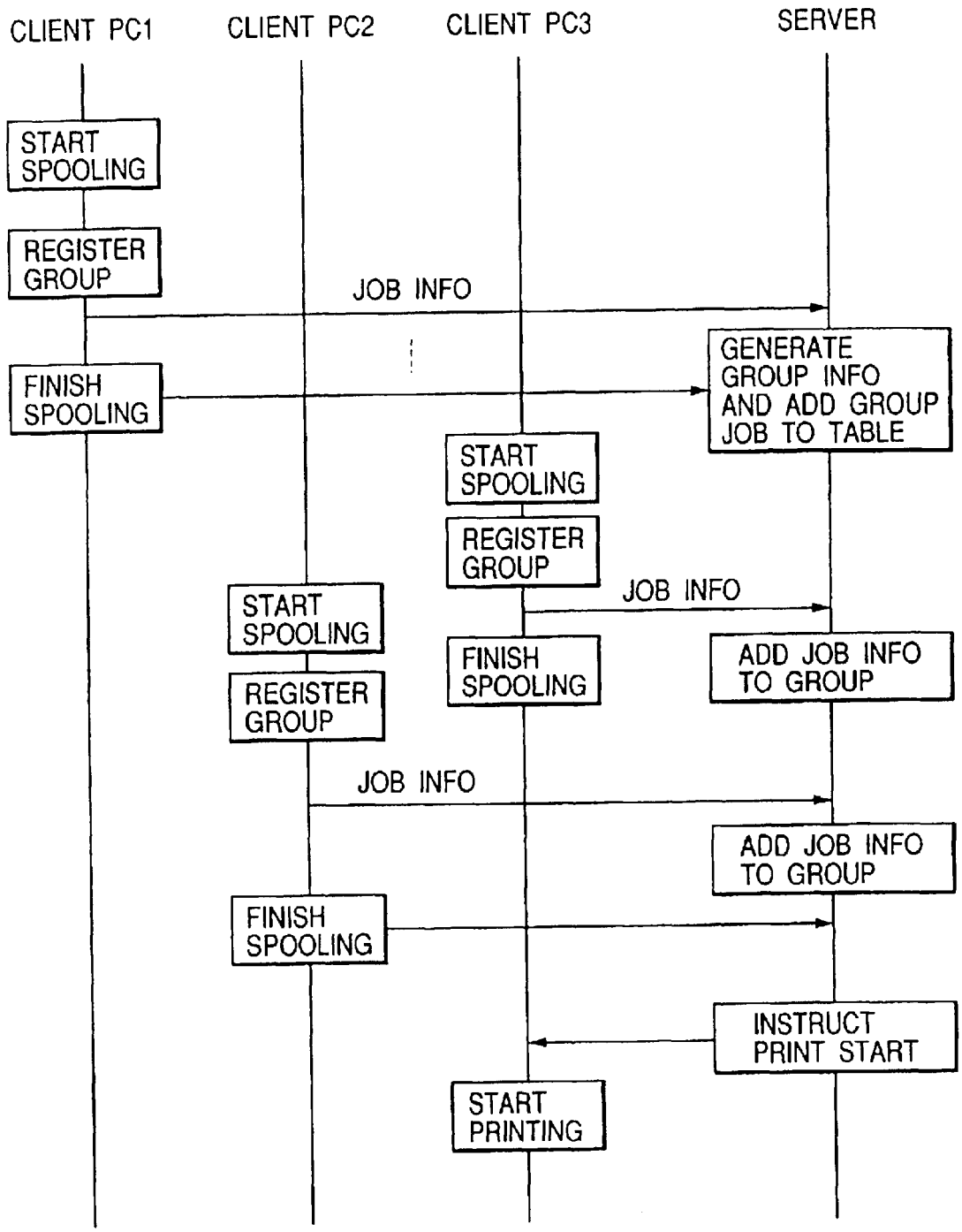
FIG. 9 is a sequence diagram briefly illustrating a processing in the present invention.

FIG. 9 is a sequence diagram of the present invention showing an example of a procedure for grouping and printing the print jobs received from the three clients.

Initially, referring to FIG. 9, the procedures of the clients and the server in the group print according to the present invention will be described. In FIG. 9, the clients PC1, PC2, and PC3 spool respective print jobs (print job 1, print job 2, and print job 3) in the client spoolers. Further, each client informs the print server of the job information. The print server groups the print jobs on the basis of the print information and prints them in accordance with a print order designated by each client, for example, an order of the print job 3, the print job 2 and the print job 1.

Initially, the print job to be grouped and printed is generated and a client spooling step is carried out from the client PC1. In the case where the group job is first generated, the group designating information shown in FIG. 8 and the job information shown in FIG. 7 are generated simultaneously with the formation of the print job. The client PC 1 instructs the print server to perform a group print by using the group designating information and the job information. At this time, the print server generates the group information on the basis of the received group designating information and the job information, adds a new group job to the above described group job management table and manages it. The group job management table has cells of the total number of jobs in the group job and a state of "waiting for print" after receiving the job information is written in a proper cell on the basis of the information of the print order in the group included in the job information received from each client and the cell is updated. The server manager 611 monitors the group job management table 616 in the job management table 613 to decide whether or not all the status of cells with the total number of jobs of a group name of ION becomes a state of "waiting for print." More specifically, when the server manager 611 decides that all the print jobs in the same group become a state of "waiting for print", in other words, they are spooled by the clients or the server, it supplies a print request to a print queue for a printer to which the information is outputted and begins to control an order relative to other print jobs in order to start the printing step of the group job.

Next, the job information (a group name is designated) shown in FIG. 7 is inputted to the print server from the client PC3 and the client PC2 and the group management table is respectively updated so that a print request is supplied to the print queue as mentioned above. In this case, the print order in the group is set to a sequence of the clients 1, 2 and 3. However, a timing at which the job information is supplied to the print server or a timing at which the job information is spooled in each spooler may be arbitrarily set, because the print order in the group is determined in the job information of each print job.

When the client PC1 shown in FIG. 9 starts the printing step of the print job to be grouped by the printer driver, the print job is spooled once in the spooler 604 of Windows, and then, the print job spooled similarly to an ordinary printing for the OS is outputted. The client manager 605 catches the outputted print job and spools it in the client spooler 606. Then, the client manager decides the set-up of the print job and generates the job information while the client manager 605 spools the print job in the client spooler 606 and supplies it to the print server 610 as a print request, in the case of the client spool. Further, the job information may be generated by the printer driver 603. On the other hand, in the case of the server spool, the client manager 605 supplies the print job spooled in the client spooler 606 to the print server 610 as the print request to spool the print job in the server spooler 612 of the print server.

Figure 10:
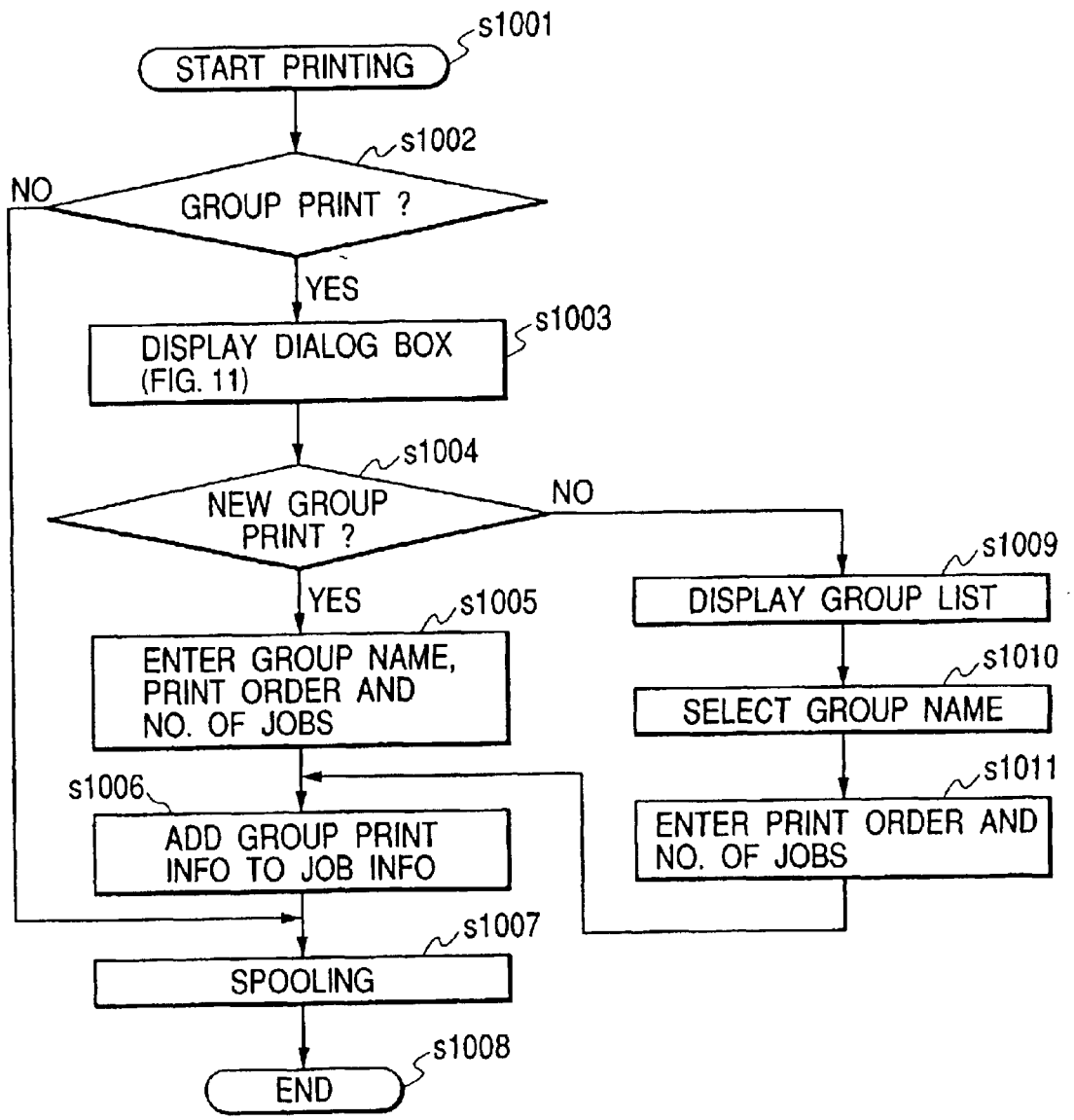
FIG. 10 is a flow chart of an example of a first data processing procedure in an information processing unit related to the present invention.

FIG. 10 is a flowchart showing one example of a first data processing procedure in the information processor according to the present invention, which corresponds to the spool processing procedure by the client 601 shown in FIG. 6. Here, s1001 to s1006 designate respective steps.

Figure 19:
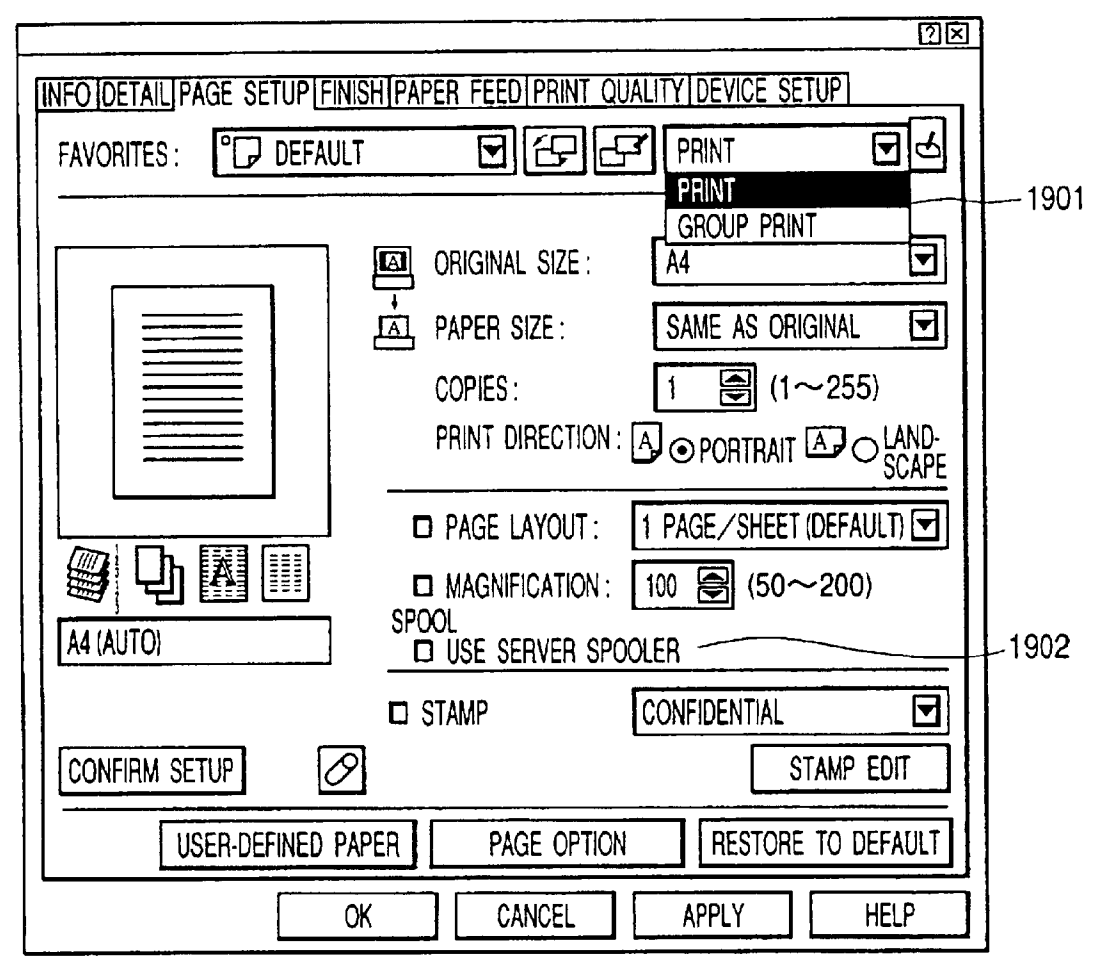

In the client 600, when the application 601 starts a printing process, a user sets a printing step by employing a graphical user interface (see FIG. 19) for setting the printing step provided by the printer driver in step s1001. The printer driver 603 provides a graphical user interface screen for setting the print step and displays it on the display 207 through the OS. Referring to FIG. 19, 1901 denotes a menu capable of setting the types of print job. In "print" of the menu, a print job is generated for an ordinary printing process, and the print job is transmitted to the print server or the printer together with a print request. On the other hand, in "group print" in the menu, a print job is generated as a group print job (also called a grouping job. This print job is not spooled in the print server or the client. The job information is outputted to the print server.

After print set-up values are set by the user, the application 601 begins to output the graphic drawing data to the graphic engine 602, that is to say, starts a printing process. Thus, as mentioned above, the graphic engine receives the GDI function as the graphic drawing data, converts the GDI function into the DDI function and delivers it to the printer driver 603. The printer driver 603 generates print data described by a page describing language on the basis of the received DDI function and supplies the print job to the Windows spooler 604. The Windows spooler 604 outputs the received print job to the client manager 605.

When the client manager 605 starts a spool processing for the client spooler 606 of the print job received from the Windows spooler 604, the client manager 605 obtains the job ID from the server manager 611 of the print server 610 and generates job information as shown in FIG. 7, for instance, JOB-INFO-2 of Windows. The job information except the "job ID" can be created on the basis of information in the client. For instance, the "printer name" may be the name or the path of a printer designated in a device to which the job information is outputted. As for the "document name," the name of a document may be got from the application 601. Further, the "permission/inhibition of group print" can be generated by judging whether the menu 1901 is set to the "group print" or the "print," as mentioned above. Further, in the "spool method," is generated information indicating that whether or not the check box of the server spooler in a spool method 1902 shown in FIG. 19 is checked, and, the server spooler is used when the check box is checked, and the client spooler is used when it is not checked.

A communication method between the client and the server may depend on, for instance, a multiprotocol function such as RPC or a processing utilizing the communication function of Winsock or Win 32API and may not depend on a specific communication method.

In step s1002, the client manager 605 decides whether or not this job is the job of the group print or an ordinary job by setting up the print step of the print job or viewing the "permission/inhibition of group print" of the generated job information.

Further, while the "permission/inhibition of group print" is designated by a user upon instruction of a print by employing the graphical user interface for setting the print step of the printer driver, and then, the print is instructed, the display of the graphical user interface screen may be carried out by displaying a DLL registered as the port monitor of the Windows spooler 604 or a dialog in the client, every time data is supplied to the port as a contact for the Windows spooler 604, or designating the screen as a port exclusively used for a group print for each port. For instance, the group printing may be automatically carried out on the basis of information capable of specifying the print job to be grouped by the printing system according to the invention, such as a prescribed document name employed by the application or an ID allocated uniquely by the Windows spooler 604, etc.

The above designation is different from an ordinary job only in respect of a point that designating information related to the group print is added to the job information of each job, so that this designation can be registered as a set-up for each port on the client. However, a special set-up is not needed for setting the printer or the printer server as common resources to other clients.

When it is decided that the above job is the print job for a group printing in accordance with the decision in the step s1002, the client manager 605 supplies a dialog box for receiving a designation from a user shown in FIG. 17 to the OS and displays the dialog box on the display 207. The dialog box shown in FIG. 17 can designate a group name (or ID) for designating the group print, the total number of jobs in the group and the print order as shown in FIG. 8. The user designates the group name and the print order by using the keyboard 206 or a mouse, etc.

As for a method for designating the group printing, since the group designating information may be designated for each job, any method for uniquely specifying the contents of the group designating information relative to information (document name, job ID, etc.) capable of a job may be possibly employed. Further, the designated values possessed by the client such as a registry or an INI file may be employed without display of the dialog box and a manual input, or a plurality of information may be held so that the user can select it.

Next, in step s1004, the client manager 605 decides whether the grouping job is a new grouping job or a grouping job already registered in the print server 610 on the basis of the group name inputted by the user relative to the dialog of FIG. 17 displayed in step s1003. In other words, upon designation of the group name shown in FIG. 17, when a new name is inputted by the user, the client manager decides that it is a new grouping job. When a "reference button" 1701 is pushed to refer to the group name of the grouping job registered in the print server 610, the client manager decides that the grouping job is the already registered group print. When it is decided that the grouping job is a new group print, the print manager shifts the process to step s1005.

In the step s1005, the client manager 605 urges the user to manually input the information of a print order in the new group job and the total number of print jobs in the new group job. Further, the client manager 605 adds group print designating information including a group name, a print order in the group and the number of jobs in the group to the job information shown in FIG. 7.

In step s1006, the client manager 605 adds information including a group name (or ID), a print order, the total number of jobs, etc, for designating the group print shown in FIG. 8 to the job information of the print job, on the basis of the input of the dialog box. The present invention is described on the assumption that members for the group print are included in the job information. However, for instance, information capable of discriminating the group print is embedded in comment information or a document name so that the present embodiment can be realized without preparing special members (for instance, a character line such as Group 01-1-5 is added to a comment or a document name).

Then, in step s1007, the client manager 605 performs a spool processing of the print job. The spool processing is performed in such a manner as described below. First, the client manager 605 views the "spool method" of the job information to decide whether the print job is the print job of the client spool or the print job of the server spool. When the client manager decides that it is the client spool, the client manager 605 spools the print job received from the Windows spooler 604 in the client spooler 606 so as to coordinate with the group designating information, and transmits the job information (see FIG. 7) and the group designating information (see FIG. 8) to the print server 610. On the other hand, when the client manager decides that it is the print job of the server spool, the server manager 605 sends the print job, the job information and the group designating information to the print server 610 to open the printing step in the client 600.

Next, the spool procedure of the clients 2 and 3, that is to say, a procedure for adding remaining print jobs to a proper grouping job will be described after the grouping job is set up.

A procedure from steps s1001 to s1003 is the same as that of the above processing, and accordingly, the explanation thereof will be omitted. In step s1004, the client manager 605 decides whether the grouping job is a new grouping job or a grouping job already registered in the print server 610 on the basis of the group name inputted by the user for the dialog in FIG. 17 displayed in the step s1003. In the dialog shown in FIG. 17, when the "reference button" 1701 is pressed in accordance with the instruction of the user to refer to the group name of the grouping job registered in the print server 610, the client manager decides that it is the registered group print and advances the process to step s1009.

In the step s1009, the client manager 605 asks the server manager 611 of the print server 610 about the list of the grouping jobs spooled in the print server 610. This inquiry means may be an ordinary communication between processes such as the RPC processing of API, for instance, the Enumjobs of Win 32API.

For this inquiry, in the print server 610, there will be carried out processings as mentioned below. Initially, when the server manager 611 receives the inquiry of the list of the grouping jobs from the client manager 605, the server manager 611 refers to the group job management table 616 managed in the job management table 613 to generate the list of the grouping jobs to respond to the client manager 605. Then, the server manager 611 returns the generated list to the client manager 650. Further, in the cases other than the inquiry, various kinds of spool processings are carried out. When a print request including the job information is received from the client, the server manager 611 recognizes the print request and controls the job management table 613 to manage a print order. At this time, when the job management table 613 analyzes the job information to decide that the print request is the group print job, the job management table 613 updates the group job management table 616 so as to indicate that the job of a relevant print order is spooled in a new job or the already registered grouping job. At the same time, the server manager 611 spools the print job in the server spooler 612. In the case where the spool method is the client spool, only the job information is managed and the spool processing is left to the client.

In the step s1009, the client manager 605 acquires the list of the grouping jobs from the server manager 611 in accordance with the above inquiry, generates data for display and displays it on the display 207 through the OS as shown in FIG. 18.

FIG. 18 shows one example of a display screen formed by the client manager on the basis of the list of the grouping jobs managed by the group job management table.

Reference numeral 1801 denotes the name of the grouping job managed by the print server 610. 1803 denotes a print order in each group with the total number of jobs and the print order displayed. 1803 denotes the status of a print job. A notice of "waiting for print" indicates that the print job is already spooled. A notice of "not processed" indicates that a print job corresponding to a relevant print order has not been spooled yet. 1804 denotes a spool method. A "client" indicates the print job including print data is spooled in the client spooler 606. A "server" indicates that the print job including print data is spooled in the server spooler 612. 1805 denotes the name of a client who performs the print request of a corresponding print job.

In the graphical user interface, the user can determine a selection state for each print job by using a pointing device such as the keyboard 206 or a mouse. In the example of FIG. 18, a second print job in the print order of a Group 2 located in a range shown in 1806 is selected. When an OK button 1807 is designated under this selected state, each item of the dialog for designating the group print illustrated in FIG. 17 is automatically selected. For instance, when the OK button 1807 is designated while the range of 1806 is selected, "Group 2" is inputted as the group name shown in FIG. 17, and "2/5" is automatically inputted as the print order.

When the print job is designated by the user as shown in FIG. 18 in such a manner, the client manager 605 decides the group name of the designated print job in step s1010, and inputs the decided group name to the item of the group name. Subsequently, in step s1011, when the print job is designated by the user as shown in FIG. 18, the client manager 605 decides the print order and the total number of jobs of the print job and inputs them to the respective items.

As described above, according to the present embodiment, the user designates the print job in the grouping job by using the graphical user interface screen so as to automatically input the respective items. The present invention is not limited thereto. For instance, the client manager 605 may get only the group name of the grouping job from the print server 610 to designate the grouping job therefrom, and then, the user may manually input the print order or the like.

When various designations in the group print job are set, the procedure advances to a processing of step s1006. Steps after the step s1006 are the same as those described above, and accordingly, the explanation thereof will be omitted.

FIG. 16 is a diagram showing one example of the data structure of group print information created by the server manager 611 of the print server 610 shown in FIG. 6. This group print information is formed on the basis of the job information and the group designating information received from the client.

As illustrated in FIG. 16, according to the present embodiment, group names, the total number of jobs, printer names, printer status and job IDs, print orders, status and client names are included so that the number of them correspond to the number of jobs.

Now, by referring to a flowchart shown in FIG. 11, there will be described a spool processing by the server manager 611 operating on the print server 610 shown in FIG. 6.

Figure 11:
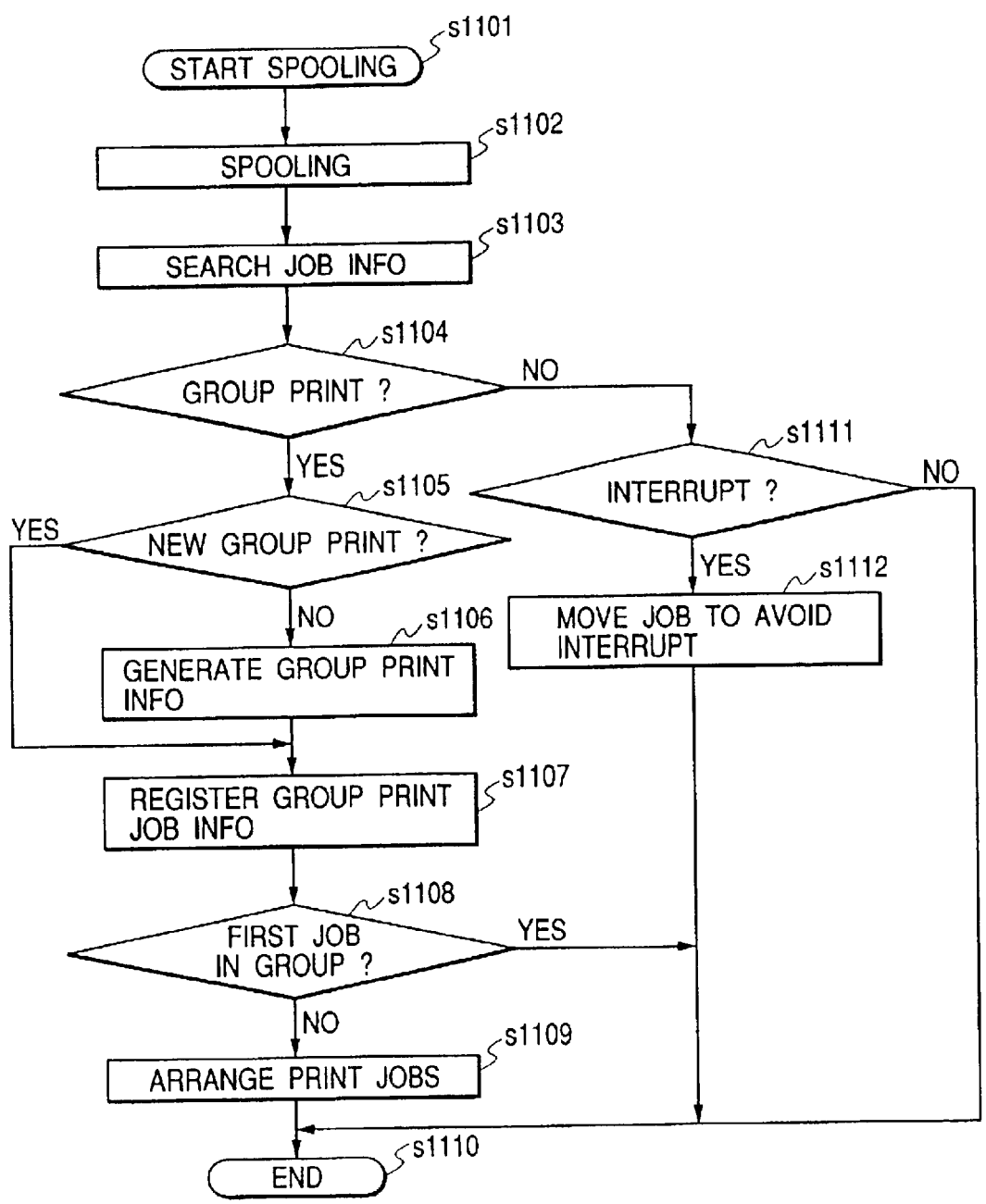
FIG. 11 is a flow chart of an example of a second data processing procedure in an information processing unit related to the present invention.

FIG. 11 is a flowchart showing a second data processing procedure in the information processor according to the present invention, which corresponds to the spool processing by the server manager 611 operating on the print server 610 shown in FIG. 6. Here, s1101 to s1112 denote respective steps.

In the step s1101, when the spool processing of a job from the client 600 is started, the server manager 611 generates a job ID and delivers the job ID to the client manager to perform a spool processing mentioned below in step s1102.

In the step s1102, the server manager 611 receives job information and a print request from the client manager 606. Further, the server manager 611 also receives group designating information from the client manager 606 as required. When the server manager 611 receives the print request, the server manager 611 updates a print queue in order to start the management of the print order as a result of receiving a new job in the print queue in the job management table 613, and spools the print job received from the client in the server spooler 612. When the server manager 611 does not receive the print job from the client, in other words, in the case of the print job subjected to the client spool processing, the client spools the print job, and the print server 610 manages the print order.

Subsequently, in step s1103, the server manager 611 searches the job information delivered from the client manager 606. Then, in step s1104, the server manager 611 decides whether or not the print job is a grouping job as a print job in which a group print is designated depending on the presence or absence of group print designating information in the job information.

When the print job is the print job with a group print designation, proessings are different between the spool of the first job and the spool of a second job and jobs after that in the same group as described below.

In step s1105, the server manager 611 decides whether or not the received print job is a new group print job on the basis of the job information and the group designating information. When it is decided that the print job is the new group print job, the procedure advances to step s1106. Otherwise, in other words, if group print information (GP-INFO) shown in FIG. 16 is already generated on a storage device, the processing advances to step s1107.

In the step s1106, the server manager 611 generates the group print information (GP-INFO) and stores the new group print information in the group job management table 616 of the job management table 613. This group print information GP-INFO is managed on the basis of list data for each printer in which the print step is designated.

Then, in the step s1107, the server manager 611 records information peculiar to the job such as the printed client name (or address) or the print order in the group, etc. to the generated group print information (GP-INFO) from the job information.

Next, in step s1108, the server manager 611 decides whether or not the print job is a first job in the print order in the same group. In this case, when the print job is the first job, the spool order of the job corresponds to the print order in the group. Therefore, the procedure advances to step s1110 to finish the spool processing without changing the position of the job.

Then, in the decision of the step s1108, when it is decided that the print job is not the first print job in view of the print order, the procedure moves to step s1109 to arrange the job information of the print job so as to correspond to the sequence designated in the same group and to arrange the spool order of the print job in the server spooler 612 as required.

Now, the spool order of the print jobs will be described below. This processing is carried out at the time of a spool processing of the print job of the server spool. More specifically, any job before the print job in the print order which is being processed, among jobs already spooled in the group print information (GP-INFO) moves just after that job. If only jobs after the print job in the print order which is being processed are spooled, that job will move so as to come to the first, and the procedure moves to step s1110 to finish the spool processing. The print jobs are spooled in accordance with the print order as described above, so that the print jobs can be easily read upon print of the grouping job. However, even when the spool order of the print jobs does not correspond to the print order of the print jobs, the print processing of the jobs can be actually performed.

On the other hand, in the step s1104, when it is decided that the spool is equal to a spool of the print job which is not the group print job, the procedure moves to step s1111. In the step s1111, the server manager 611 recognizes whether or not a present spool position interrupts jobs printed in accordance with the group print designation. If the server manager decides that the spool position of the print job interrupts the jobs with the group print designation in the same group to designate the change of another order such as a priority (in the case of YES), the server manager decides whether or not the jobs before and behind that spool position are of group print designation from the job information. In step s1112, the spool position is changed so as to spool the job behind the former position. In the step s1111, if an ordinary spool position does not interrupt the group print jobs, the procedure directly advances to step s1110 to finish the spool processing.

As for the print processing of the spooled print job, there will be described the processing of the server manager 611 of the print server 610 by referring to a flowchart shown in FIG. 12.

Figure 12:
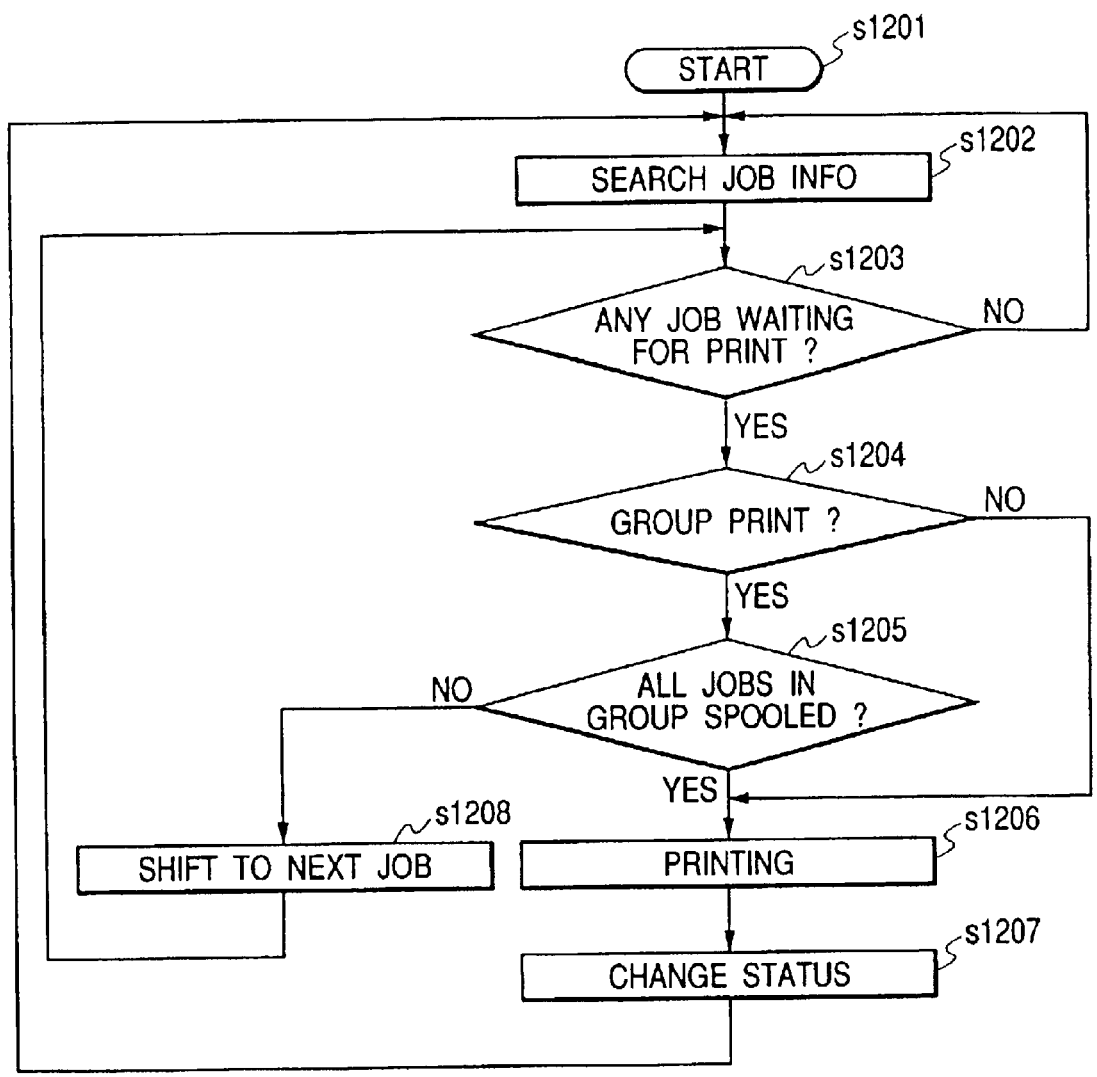
FIG. 12 is a flow chart of an example of a third data processing procedure in an information processing unit related to the present invention.

FIG. 12 is a flowchart showing one example of a third data processing procedure in the information processor according to the present invention and corresponds to that of the server manager 611 in the print server 610 shown in FIG. 6. This procedure is executed for a process unit like the thread of Windows in such a way that the server manager 611 monitors the status of a printer under the control connected to the network, manages spooled jobs, and successively starts the transmissions of the print jobs to proper printers. s1201 to s1208 denote respective steps.

First, in step s1201, the server manager 611 monitors the status of the printer under the control. When the server manager decides that the print job can be transmitted to the monitored printer, this process is started. Then, in step s1202, the server manager 611 searches job information spooled in the job management table 613. Then, in step s1203, the server manager decides whether or not the print job waiting for print is present among the print jobs to be transmitted to the proper printer in the job management table 613. When this state is a steady state and there is no print job waiting for print, the server manager stays in the step s1201 to continuously wait for a job to be spooled until it is decided that the job waiting for print exists in the step s1203.

On the other hand, in the step s1203, when it is decided that there is a job waiting for print, the server manager 611 decides whether or not the print job waiting for print belongs to a group print. If the print jobs are arranged in the print order of group print designation, the server manager 611 analyzes the group job management table 616 in step s1205 so that it decides whether or not all print jobs in the same group are spooled. In this case, when the server manager decides that all the print jobs in the group are spooled, the server manager 611 carries out the print processing of the grouping job in step s1206. Specifically, the server manager 611 transmits the print jobs sequentially spooled in accordance with the print order in the group-to the printer. In this transmit processing, the server manager 611 recognizes the spool method of the print job in the print order, reads out the proper print job stored in the server spooler 612 in the case of the server spool, and transmits the print job to the printer through the network. Further, in the case of the client spool, the server manager 611 recognizes the client 1805 shown in FIG. 18 and supplies print transmit permission information including information for designating the job ID to the relevant client. When the transmit processing of print data to the printer 105 from the print server 610 or the client 600 is completed, the server manager 611 changes the status information of the group print information (GP-INFO) managed in the group job management table 616 and the group management table 610 shown in FIG. 6 to "end of transmission" to shift to a processing of the print job corresponding to a next print order. The jobs of the same group are continuously transmitted to the printer 105 to perform a print process by repeating the print procedure.

On the other hand, in the step s1205, when it is decided that the print order of the first job of the same group is obtained before all the jobs in the same group are spooled so that all the print jobs of the same group are not spooled, the procedure advances to step s1208. The server manager 611 shifts its control to a next print job in the print queue for the relevant printer and returns to the step s1203 to continue to process the next job similarly.

In the step s1204, in the case where it is decided that the print job of the print order in the print queue 615 is an ordinary print job, the procedure directly moves to step s1206 so that the server manager 611 performs the print processing (transmission control of the print job) as described above. The print processing is carried out in the print server 610 accordance with the above procedure.

If the print is not recognized, after the transfer of data is completed, the group print information GP-INFO is deleted when the job is deleted.

These procedures are performed, so that even when a plurality of series of print jobs printed at arbitrary timing by a plurality host computers are spooled in the print server under a state in which ordinary jobs mixed, or spooled in the client, they can be continuously printed together in regular order designated for the same printer.

[Second Embodiment]

Now, a second embodiment of the present invention will be described below. After the print jobs are printed in accordance with the procedure described in the first embodiment, the server manager 611 of the print server 610 may recognize the print state of each print similarly to the ordinary print job from the printer 105, record it in the group print information and inform the client manager 605 of the client 600 in which the respective jobs are spooled of the end of print after recognizing the end of printing processes of all the print jobs in the group print information. The above matter will be described in the second embodiment.

Figure 13:
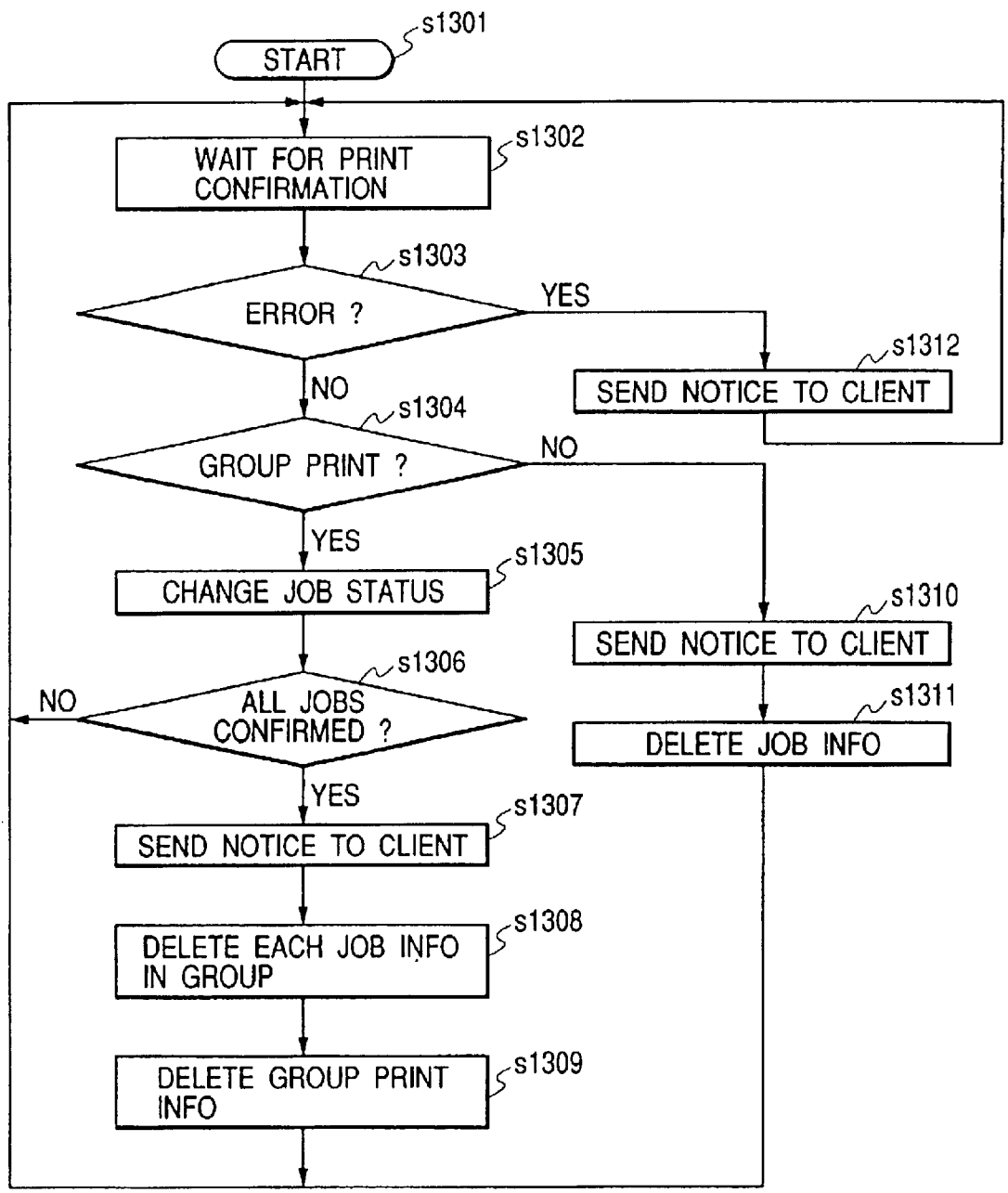
FIG. 13 is a flow chart of an example of a data processing procedure in an information processing unit illustrating a second embodiment of the present invention.

FIG. 13 is a flowchart showing one example of a fourth data processing procedure in the information processor according to the second embodiment of the present invention, which corresponds to a print recognition thread (detailed procedure of print recognition process) by the server manager 611 shown in FIG. 6. Steps s1301 to s1312 denote respective steps.

Initially, in step s1301, the print recognition thread is started. This thread may be started upon start of the server manager 611 and stay until the power of the server machine 610 falls, or may be started only during a period after the print processing until the print recognition is obtained and the operation of the thread is finished at an arbitrary timing.

Then, after the start of the thread, in step s1302, the server manager 611 monitors the status of the printer under control through the network to wait for the notice of print recognition from the printer 105.

In this recognition method, for instance, in the case of the network printer under the network environment of TCP/IP, the print server may carry out a polling using a command such as get of SNMP, or may receive a notice from the printer 105 by a trap or the like.

Further, in the case the printer is connected to a local places, a communication through a center-cable may be employed and any protocol or any method for obtaining information may be utilized.

In such a manner, when the notice of print recognition is sent to the server manager from the printer 105, in step s1303, the server manager 611 decides whether or not a notice of error of the print job is sent from the printer 105. When the server manager 611 decides that the notice of error is sent, the procedure moves to step s1312. Then, the server manager 611 recognizes the client of the related print job by using the group job management table shown in FIG. 18 and gives notice of an error to the client manager 605 of the relevant client 600.

On the other hand, in the step s1303, when the server manager decides that the notice of error is not sent from the printer, in step s1304, the server manager 611 decides whether or not the print job is the group print job from the job information of the print job in which the end of print is recognized. When the server manager decides that the print job is the job of group print, the server manager updates the status of the relevant print job in the group job information (GP-INFO) from "during printing" to "end of printing" in step s1305.

Then, in step s1306, the server manager 611 decides whether the end of printing of all the print jobs in the group print job information (GP-INFO). When the server manager decides that there remain jobs which are being printed, the manager returns the process to the step s1302 to wait for a notice of print recognition from the printer 105.

On the other hand, in the step s1306, when the server manager decides that a notice of print recognition of the last job in the group is sent from the printer, the server manager 611 shifts the process to step s1307 to give notice to the client manager 605 of the client 600 supplying the print request for the print job in the group. After the server manager gives notice to each of the clients, the server manager 611 deletes all job information of the same group instep s1308.

When the print job including print data remains in the server spooler 612 even after the print processing, the server manager 611 delete the print data as well as the job information.

After the job information in the group is deleted in such a way, in the step s1309, the server manager 611 deletes the group print information whose print is finished and returns to the step s1302.

On the other hand, in the step s1304, when a notice of print recognition of an ordinary job is sent from the printer, the server manager 611 gives notice to the client 601 of each client machine in step s1310, deletes the job in step s1311 and returns to the step s1302.

According to the above described procedure, the print recognition of the group print can be also done by hardly adding an excess processing to the procedure for recognizing the printing process of the ordinary job.

Therefore, even when only the print recognition of each job can be obtained from the printer 105, it can be recognized that the printed jobs are printed and discharged together, and a notice that the jobs are printed together can be given to a host computer supplying a print request for each print job.

[Third Embodiment]

According to the second embodiment, it is recognized that the print jobs for which the print requests are sent are printed and the printed jobs are discharged together and the notice that the print jobs are printed together is sent to the client (host computer) issuing the print request for each print job. However, any error may be possibly generated in the printer 105 during the printing process. In the case where an error is generated in the printer before the print jobs to which the print requests are issued are printed and the printed jobs are delivered together, a configuration may be used in which the destination where printing is performed is changed together to another printer on the network. Now, a third embodiment of the present invention will be described hereinafter.

Figure 14:
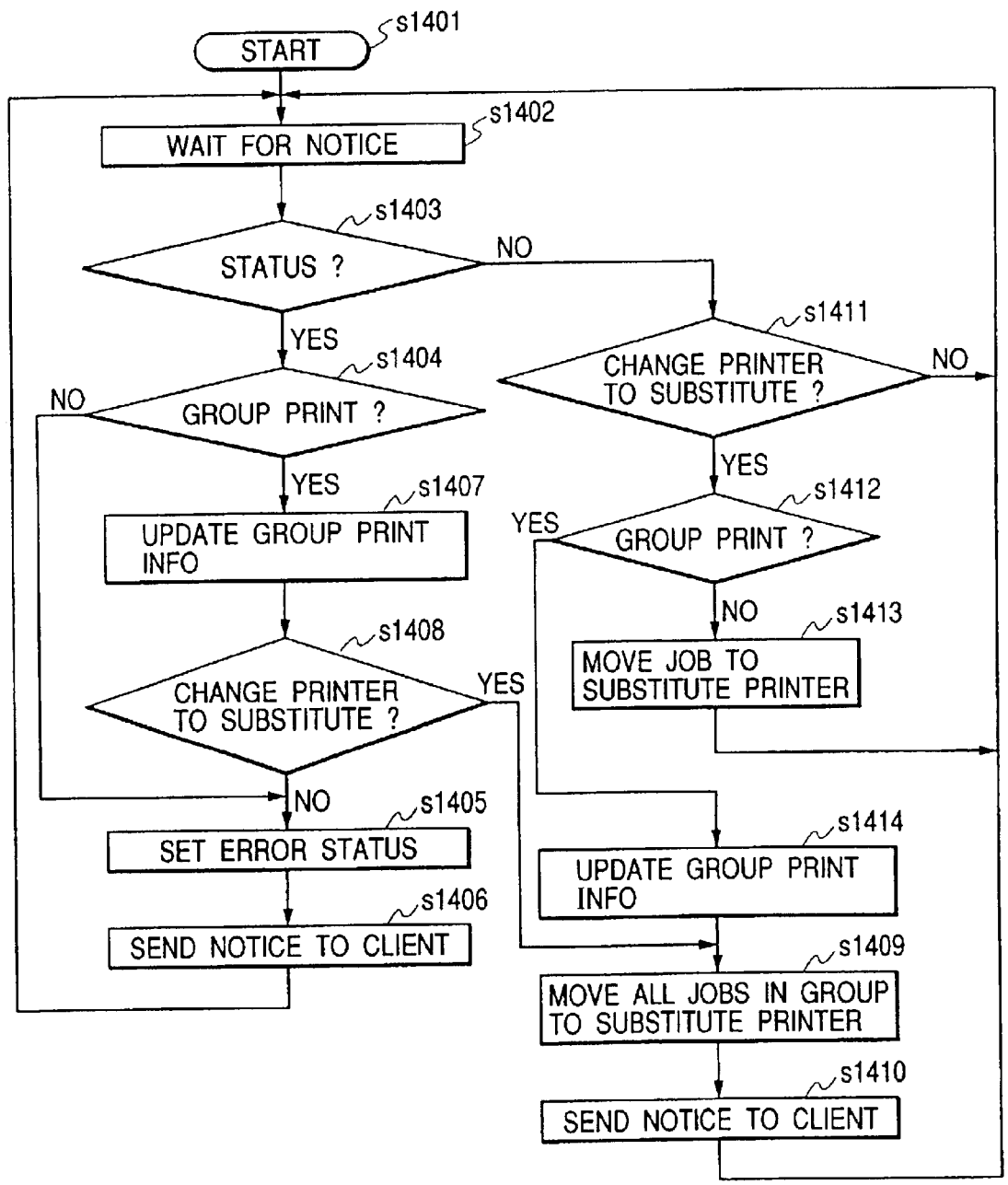
FIG. 14 is a flow chart of an example of a first data processing procedure in an information processing unit illustrating a third embodiment of the present invention.

FIG. 14 is a flowchart showing an example of a fifth data processing procedure in the information processor showing the third embodiment of the present invention, which corresponds to the procedure for changing the printer to another printer by the server manager 611 in the print server 610. Steps s1401 to s1414 denote respective steps. Further, in the third embodiment, the printing process is performed in accordance with the procedure of the first embodiment, and a process will be described after the print server is brought into a state in which the print server waits for print in accordance with the procedure of the second embodiment.

First, in step s1401, when a process of print recognition is started, the server manager 611 is put to a state in which the server manager 611 acquires the status of the printer 105 or the print job on the basis of the notice from the printer 105, or is waiting for receiving a notice from the client 601.

Next, in the step s1402, when a notice of the error of the print job is sent to the server manager 611 from the printer 105, the server manager 611 decides whether or not the error corresponds to the error of the job after the transfer of data in step s1403. In this decision, the status of each job may be obtained directly from the printer 105. When the error of the printer 105 is generated before the print recognition is not got, this may be judged as the error of the job. When the normal completion of the job cannot be recognized, it may be judged as the error of the job.

In the step s1403, when it is decided that the error of the print job is an error after the transfer of data to the printer 105, the server manager 611 searches the job information from a notified job ID to decide whether or not the print job is the group print job on the basis of the job information. Here, when it is decided that the print job is not the print job of the group print, the server manager 611 sets the status of the print job to "error" in step s1405, gives a notice that the job is printed to the client manager 605 of the client 600 in step s1406 and returns to the step s1402 to wait for a next recognition.

On the other hand, in the step 1404, when it is decided that the print job is the group print job, the server manager 611 updates the group print information (GP-INFO) in step s1407 to judge the status of the print job of the group print information (GP-INFO) as an error.

Next, in step s1408, the server manager 611 decides whether or not the substitute of the printer is designated upon error of the printer. This decision process is carried out after the client points out the error upon generation of the error, as described below. The information of a substitute printer name is previously added to the group designating information shown in FIG. 8 and the substitute printer name is managed in the group print information (GP-INFO) shown in FIG. 16 so that the server manager 611 can decide it.

Here, when it is decided that the substitute printer for the currently employed printer is not designated, the server manager 611 only changes the status of the print job in the steps s1405 and s1406 similarly to the ordinary job, and then, gives a notice to the client manager 605 of the client 600. In this case, the change of the printer is not executed until an instruction is sent to the server manager from the client manager 605 of the client 600.

On the other hand, in the step s1408, when the substitute printer for the printer is designated upon generation of an error, the procedure advances to step s1409, and the server manager 611 shifts all the job information in the group to the list data of a substitute printer, for instance, a printer 650. Further, the management of the group print information (GP-INFO) is also shifted to the group print information list of the new printer. In this case, after the print server 611 changes the automatically spooling printer, in step s1410, the server manager 611 gives a notice of the change of a printer to the client of the client machine, After the printer is changed to another printer, the print jobs are printed as the jobs of the group print in a similar manner to that of the first embodiment.

On the other hand, when an instruction is supplied so to change the printer to a substitute printer after steps 1402 and s1403 shift to step s1411 shown in FIG. 14, the server manager 611 decides whether or not the print job of the substitute printer designated by the client is the group print job in step s1412 on the basis of the job information. When the print job is not the job of group print, the server manager 611 moves only the designated print job in step s1413. When the print job is the job of group print, the server manager updates group print information (GP-INFO) in step s1414, shifts to the steps s1409 and s1410. The server manager 611 changes the output part of all the print jobs in the group to the substitute printer and spools the job information of the print jobs in the print queue in the relevant printer.

The substitute printer may be designated on the basis of a registry, an INI file and information for managing the printers by the print server or the printers having the same printer driver may be selected at random. Accordingly, any method for designating the printer which can normally print created documents can be utilized. Now, there will be described a processing when the printer of the job is changed to other intended printers in accordance with the instruction of the user of the client 600 after the print recognition from the print server 610 is notified upon generation of the error.

Figure 15:
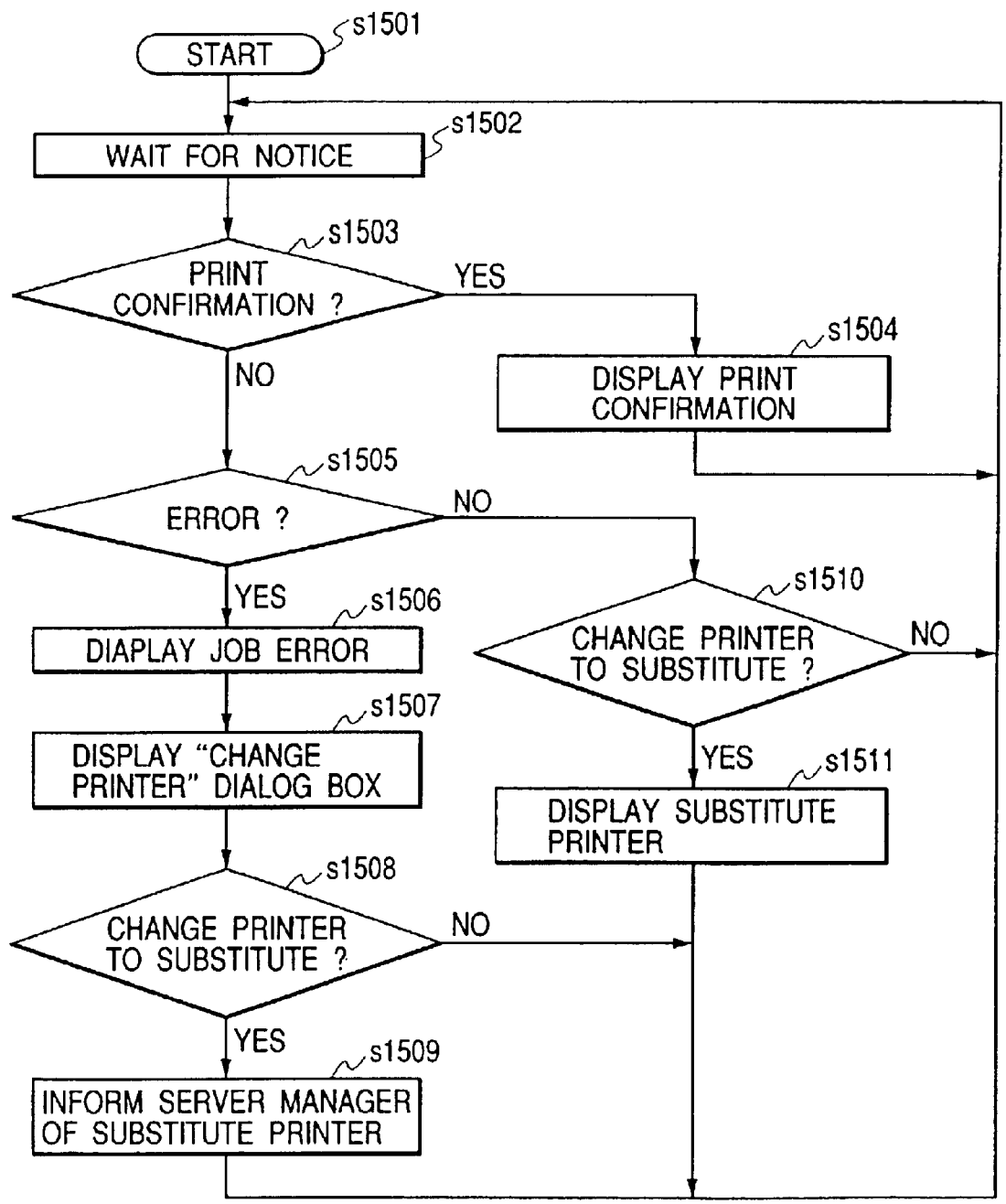
FIG. 15 is a flow chart of an example of a second data processing procedure in an information processing unit illustrating a third embodiment of the present invention.

FIG. 15 is a flowchart showing one example of a sixth data processing procedure in the information processor showing the third embodiment of the present invention, which corresponds to the procedure of print recognition of the client manager 605 and the procedure for changing the printer of the group print in the client manager 605 (a printer change procedure after notification of the error of the job). s1501 to s1511 denote respective steps.

First, in step s1501, the above described process is started upon start of the client manager 605 or after the print processing, the client manager 605 is waiting for an instruction in step s1502. When any instruction is sent to the client manager 605 from the server manager 611, in step s1503, the client manager 605 decides whether or not the instruction is the notification of print recognition in other words, the print confirmation. Whether or not the printer is changed to the substitute printer, the print confirmation is similarly carried out.

In step s1503, when it is decided that the print confirmation is supplied to the client manager, in step s1504, the client manager 605 provides, for example, the graphical user interface screen showing the change of the status or the like such as the dialog box or the print manager print manager and displays the print confirmation or notification on the display 207 through the OS to give a notice to the user. Then, the procedure returns to the step s1502 after the confirmation.

In case of the group print, after the confirmation process to the client is finished, the job information is deleted. Therefore, for this display process, a special display for indicating that the print confirmation of the group print is completed may be done by obtaining the job information or the group print information queue from the server manager 611 of the print server 610.

On the other hand, in step s1503, when it is decided that the notice is not the print confirmation, the client manager 605 decides in step s1505 whether or not the notice is an error notice. When the client manager 605 decides that the notice is the error notice, the procedure advances to step s1506. The client manager 605 provides a dialog showing the error of a job to display it on the display 207 through the OS and notify the user of the error. In this display, the client manager 605 may give a notice to the user as the change of the status of the print job like the print manager of Windows without displaying a special notice message.

Then, after the notice of an error is displayed, in step s1507, the client manager 605 provides a user interface (UI) for changing the printer such as the dialog box of Windows and displays the notice on the display 207 shown in FIG. 2.

Next, in step s1508, the client manager 605 decides whether or not the printer of the job is instructed to be changed in accordance with the instruction of the user. When the client manager 605 decides that the printer of the job is instructed to be changed to a substitute, the procedure advances to step s1509. The client manager 605 notifies the server manager 611 of the server 610 of the substitute printer to return to the step s1502. Even in the case of the job, only the substitute printer may be designated relative to the print job whose printer is to be changed.

Further, when the printer is changed to a substitute by the server manager 611, a notice of change of the printer is sent from the sever manager 611. In this case, the procedure advances to the steps s1503 and s1505 from the step s1502 for waiting for an instruction. Instep s1510, the client manager 605 decides whether or not the instruction for changing the printer is sent. When the instruction for changing the printer is not supplied to the client manager, the procedure returns to the step s1502. When the client manager 605 decides that the instruction for changing the printer is sent, the procedure moves to step s1511 to notify the user of the substitute printer through the dialog box or the like on the display 207 shown in FIG. 2. Then, the procedure returns to step s1502. In this case, after the printer changing process of the job is completed, only a notice of the changed result is sent or displayed.

The server manager 611 of the print server 610 instructed to change the printer from the client manager 605 of the client 600 as described above moves to the steps S1402, s1403 and s1411 shown in FIG. 14. In case of the instruction for changing the printer, the server manager 611 decides whether or not the job for which the change of the printer is instructed by the client is the job of group print on the basis of the job information. When the job is not the job of group print, the server manager 611 moves only the designated job in the step s1413. When the job is the job of group print, the server manager updates the GP-INFO to move to the steps 1409 and s1410 and spool all the jobs in the group in the substitute printer.

Further, when the printer of the grouping job is changed, the server manager 611 decides as follows.

First, the server manager 611 decides whether the substitute printer is a face-up printer or a face-down printer. When the substitute printer is the face-down printer, the print job may be printed from its head, so that the print job may be controlled to be transmitted in accordance with the print order of the print order of the group designating information (GP-INFO) managed by the group job management table 616, On the other hand, when the substitute printer is the face-up printer, the print job must be printed from its end.

As for the order of pages of one print job, the print job may be spooled in the printer so that a printing operation can be performed successively from the last page thereof by using the function of the printer. However, in the case of the grouping job in which a plurality of print jobs are grouped to treat them as one print job, the transmission control needs to be performed from the end of the print order of the group designating information. Therefore, in the case where the printer is changed to the face-up printer, the spool methods are decided successively from the last print job in the print order designated by the group designating information. Then, when it is decided that the server spooler 612 is employed, the print job spooled in the server spooler is transmitted. When it is decided that the client spooler 606 is employed, a transmit permission information is sent to the client manager 605 of the client issuing the print request for the print job to be printed.

Further, when the printer is changed from the face-up printer to the face-down printer, the server manager 611 may control the transmission of the print job by changing a print order reverse to a normal print order. Under this control, even when the printer is changed to a printer whose paper discharge method is different from the former printer, a printing process can be effected while the paper discharge order of the grouping job is ensured.

The change of the printer can be designated by any client. However, when instructions are first outputted from other clients, only a changed result is displayed to each client like the process for automatically changing the printer of the print server.

In accordance with the above described procedure, when a printing operation cannot be continuously performed due to the error of the printer 105 or the like before the end of all the print jobs in the group is recognized, the print server 611 can automatically change the printer to a printer designated upon default or can completely change the printer to the substitute printer in accordance with the instruction of the client manager 605 of the client 600.

In the above described embodiment, although the network printer is employed as the example, it should be noted that the present invention is not limited to the network printer, and any printer capable of transmitting data from the print server and obtaining the status information, such as a printer locally connected to the print server, may be utilized.

To the case where there is provided only the spool of the job information like a virtual print server system, and, the case where a print server function is installed in the network printer, the present invention can be applied.

According to each of the embodiments, even when a plurality of jobs are printed at arbitrary timing by a plurality of clients, the jobs can be printed together in the print order designated by the printer. Further, according to the embodiments of the invention, each client PC can recognize that all the jobs printed together are completely printed. Further, when the printing of the jobs to be printed together cannot be recognized, the printer can be changed to the substitute printer so as to print a plurality of jobs together.

Now, the configuration of a data processing program which can be read by a print system to which the information processor of the present invention can be applied by referring to a memory map shown in FIG. 20.

FIG. 20 is a diagram for explaining the memory map of a memory medium for storing various types of data processing programs readable by the print system to which the present invention can be applied.

Information for managing program groups stored in the memory medium, which is not particularly shown, for instance, version information, an implement or, etc. is also stored in the memory medium. In addition, information depending on the OS of a program read side, for instance, icons or the like for identifying and displaying the programs may be stored in the memory medium.

Further, data dependent upon a variety of programs is managed by the above described directory. Still further, programs for installing these programs in a computer or a program or the like for thawing the installed program when it is compressed, etc. may be stored in the memory medium.

The functions shown in FIGS. 10 to 15 in the above embodiments may be executed by the host computer on the basis of an externally installed program. In this case, when the information groups including programs are supplied to an output device from the external memory medium by the memory medium such as a CD-ROM, a flash memory or an FD, or through the network, the present invention may be applied.

As mentioned above, needless to say, the memory medium on which the program code of software for achieving the functions of the above described embodiments is stored is supplied to the system or the device, and the system or the computer (or a CPU or a MPU) of the device reads and executes the program code stored in the memory medium so that the object of the present invention can be realized.

In that case, the program code itself read from the memory medium realizes the new function of the present invention and the memory medium on which the program code is stored configures the present invention.

As the memory medium for supplying the program code, for instance, a floppy disk, a hard disk, an optical disk, a photomagnetic disk, a CD-ROM, a CD-R, a CDRW, a DVD, a magnetic tape, a nonvolatile memory card, a ROM, an EEPROM, etc. may be employed.

Further, it should be noted that the program code read by the computer is executed so that not only the functions of the embodiments can be realized, but also the OS (operating system) operating on the computer or the like performs a part or all of the actual processings by which the above described functions of the embodiments may be realized.

Further, it should be noted that, after the program code read from the memory medium is written in a memory provided in a function expanding board inserted into the computer or a function expanding unit connected to the compute, a CPU or the like provided in the function expanding board or the function expanding unit performs a part or all of the actual processings, by which the functions of the above described embodiments may be realized.

As many apparently widely different embodiments of the present invention can be made without departing from the spirit and scope thereof, it is to be understood that the invention is not limited to the specific embodiments thereof except as defined in the appended claims.

As mentioned above, according to the present invention, since a plurality of print jobs for which the print requests are supplied from a plurality of clients are controlled and printed before all the print jobs to be grouped are prepared, even when ordinary print jobs are mixed therein and they are spooled in the print server, the printing process of the same printer can be controlled without mixing the ordinary print jobs in the group print job.

Further, the print jobs are spooled in the client, so that the load of the network and the print server can be reduced, and the print jobs spooled in the client and the print jobs spooled in the print server can be grouped, and the print jobs can be successively transmitted and controlled according to the print order.

Still further, even when the print information for each print job can be merely obtained from the printer, the print jobs whose print operations are finished can recognized that they are printed and discharged together and inform the client of each print job that the print jobs are printed together.

Further, when the print jobs cannot be printed due to the error of the printer, the printer can be together changed to another designated printer.

Further, when the printer is changed to a printer whose discharge surface is different from that of the former printer, the printer processes the print jobs in regular order by which the print jobs are received, so that a print control can be performed while a proper print order for the grouping job is maintained.

Accordingly, even when the print jobs to be formed in an order different from the print order are successively received, they can be edited freely so as to meet the designated order, and the print jobs can be continuously printed by the same printer in an order intended by the user and can flexibly meet troubles during the printing process of the printer, the manner of the processing order of the print jobs of the printer can be expanded and the process of the printing function can be extremely improved. Therefore, the present invention can achieve excellent effects as mentioned above.

Still further, the print jobs to be printed can be grouped relative to the group print jobs already managed by the management server.

Furthermore, upon print request by the client, the user can designate a new grouping job obtained by grouping printing the print jobs from a plurality of clients.

Additionally, when the print jobs are included in the group print job already managed by the management server, the user can easily designate the group name or the print order by employing the graphical user interface.

What is claimed is:

1. A print control method carried out in an information processing apparatus, which controls print data to be printed by a printer, said method comprising:

a reception step of receiving from clients a group print request for grouping a plurality of print jobs into a single group job and printing the grouped print jobs in succession;

a print control step of controlling printing of the group job if all of the plurality of print jobs in the group job are ready;

a recognition step of recognizing whether a print job has a print end status in the printer; and a notice control step of determining whether each of print job in the group job has the print end status in response to a recognition in said recognition step, and, if each print job in the group job has the print end status, notifying the clients of the print end status, and, if at least one of print job in the group job does not have the print end status, not notifying the clients of the print end status even for print jobs have the print end status.

2. A method according to claim 1, further comprising an alignment step of rearranging and aligning an order of printing of the plurality of print jobs in the group job in an order specified by the group print request, wherein said print control step controls an order of outputting aligned print jobs for one of a plurality of printers, based on an alignment status in said alignment step.

3. A method according to claim 1, further comprising a job spooling step of spooling a print job corresponding to a print request received from a client in a spool unit, wherein, if the print job corresponding to the print request is spooled in the spool unit, said print control step sends the spooled print job to a specified printer, and, if the print job corresponding to the print request is not spooled, said print control step sends transmission permission information for permitting transmission of the print job to the client issuing the print request.

4. A method according to claim 1, further comprising a changing step of, if said recognition step recognizes that a particular print job cannot be printed by a particular printer, changing the particular printer to an alternative printer for printing the particular print job.

5. A method according to claim 4, wherein, if said recognition step recognizes that the particular print job cannot be printed by the particular printer, said changing step examines attribute information for the particular print job and changes the particular printer to the alternative printer, which is designated in advance according to the attribute information.

6. A method according claim 5, wherein, if said changing step changes the particular printer to the alternative printer, said changing step informs a client that issued a print request for the particular print job of such printer change.

7. A print control method comprising:
   a management step of managing a group job in which a plurality of print jobs are grouped and printed in succession;
   a transmission control step of transmitting the plurality of print jobs in the group job managed in said management step to a printer in a predetermined order; and
   a determination step of determining whether a printer for outputting the group job is a face-up printer or a face-down printer, wherein,
   if said determination step determines that the printer is a face-down printer, said transmission control step starts transmitting the plurality of print jobs from a first print job in a print order, and,
   if said determination step determines that the printer is a face-up printer, said transmission control step starts transmitting the plurality of print jobs from a last print job in the print order.

8. A method according to claim 7, wherein said job management step manages a spool state of each print job in the group job, and starts print processing if the spool state indicates that all print jobs in the group job have been spooled.

9. A method according to claim 7, further comprising:
   a reception step of receiving from clients a group print request for printing the group job;
   a recognition step of recognizing whether a print job has a print end status in the printer; and
   a notice control step of determining whether each print job in the group job has the print end status, and, if each print job in the group job has the print end status, notifying the clients of the print end status, and, if at least one print job in the group job does not have the print end status, not notifying the clients of the print end status even for print jobs that have the print end status.

10. A print control method carried out in an information processing apparatus, which controls print data to be printed by a printer, said method comprising:
    a reception step of receiving a group print request for grouping a plurality of print jobs into a single group job and printing the grouped print jobs in a predetermined order;
    a print control step of controlling printing of the group job if the plurality of print jobs in the group job are ready;
    a recognition step of recognizing whether each print job has a print end status; and
    a notice control step of, if it is recognized in said recognition step that the last print job in the group job has the print end status, notifying a client of the print end status, and, if it is recognized in said recognition step that at least one print job in the group job does not have the print end status, not notifying the client of the print end status.

11. A method according to claim 10, further comprising an aligning step of rearranging and aligning an order of printing the plurality of print jobs in the group job in an order specified by the group print request,
    wherein said print control step controls an order of outputting aligned print jobs for one of a plurality of printers, based on an alignment status in said aligning step.

12. A method according to claim 10, further comprising a job spooling step of spooling a print job corresponding to a print request received from a client in a spool unit, wherein,
    if the print job corresponding to the print request is spooled in the spool unit, said print control step sends the spooled print job to a specified printer; and
    if the print job corresponding to the print request is not spooled, said print control step sends transmission permission information for permitting transmission of the print job to the client issuing the print request.

13. A method according to claim 10, further comprising a changing step of, if said recognition step recognizes that a particular print job cannot be printed by a particular printer, changing the particular printer to an alternative printer for printing the particular print job.

14. A method according to claim 13, wherein if said recognition step recognizes that the particular print job cannot be printed by the particular printer, said changing step examines attribute information for the particular print job and changes the particular printer to the alternative printer, which is designated in advance according to the attribute information.

15. A method according to claim 14, wherein, if said changing step changes the particular printer to the alternative printer, said changing step informs a client that issued a print request for the particular print job of such printer change.

* * * * *

UNITED STATES PATENT AND TRADEMARK OFFICE
CERTIFICATE OF CORRECTION

PATENT NO. : 6,916,127 B2
DATED : July 12, 2005
INVENTOR(S) : Koichiro Wanda

It is certified that error appears in the above-identified patent and that said Letters Patent is hereby corrected as shown below:

Drawings,
Sheet 12, Figure 15, "DIAPLAY" should read -- DISPLAY --.

Column 1,
Line 42, "enables" should read -- enable --.

Column 3,
Line 7, "request" should read -- request is received --.

Column 5,
Line 21, "102. 103" should read -- 102, 103 --.

Column 7,
Line 20, "s" should read -- is --.

Column 8,
Line 49, "depending on" (second occurrence) should be deleted.

Column 10,
Line 51, "job." (second occurrence) should read -- job). --.

Column 16,
Line 36, "group-to" should read -- group to --.

Column 17,
Line 2, "accordance" should read -- in accordance --;
Line 7, "plurality" should read -- plurality of --;
Line 8, "mixed," should read -- are mixed, --; and
Line 44, "a" should be deleted.

Column 18,
Line 14, "instep" should read -- in step --; and
Line 17, "delete" should read -- deletes --.

Column 19,
Line 55, "machine," should read -- machine. --.

Column 20,
Line 38, "print manager" (second occurrence) should be deleted.

UNITED STATES PATENT AND TRADEMARK OFFICE
CERTIFICATE OF CORRECTION

PATENT NO. : 6,916,127 B2
DATED : July 12, 2005
INVENTOR(S) : Koichiro Wanda

It is certified that error appears in the above-identified patent and that said Letters Patent is hereby corrected as shown below:

Column 21,
Line 10, "sever" should read -- server --; and
Line 12, "Instep" should read -- In step --.

Column 23,
Line 25, "compute," should read -- computer, --; and
Line 50, "recognized" should read -- recognize --.

Column 24,
Line 30, "of" (second occurrence) should be deleted;
Line 35, "of" should be deleted; and
Line 37, "jobs" should read -- jobs that --.

Column 25,
Line 1, "according" should read -- according to --.

Signed and Sealed this

Thirteenth Day of June, 2006

JON W. DUDAS
*Director of the United States Patent and Trademark Office*